(12) United States Patent  
Kosonovsky

(10) Patent No.: US 8,887,179 B2  
(45) Date of Patent: Nov. 11, 2014

(54) COMMAND PRESENTATION AND GENERATION SYSTEMS, METHODS AND COMPUTER PROGRAM PRODUCTS USING LOGICAL TREES

(71) Applicant: CA, Inc., Islandia, NY (US)

(72) Inventor: Igor Kosonovsky, Toronto (CA)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 13/744,091

(22) Filed: Jan. 17, 2013

(65) Prior Publication Data

US 2014/0201763 A1    Jul. 17, 2014

(51) Int. Cl.
| | |
|---|---|
| G06F 3/00 | (2006.01) |
| G06F 9/44 | (2006.01) |
| G06F 9/46 | (2006.01) |
| G06F 13/00 | (2006.01) |
| G06F 9/54 | (2006.01) |

(52) U.S. Cl.
CPC ........................................ *G06F 9/54* (2013.01)
USPC ........................... 719/320; 719/318; 717/100

(58) Field of Classification Search
None
See application file for complete search history.

(56) References Cited

U.S. PATENT DOCUMENTS

| | | | | |
|---|---|---|---|---|
| 4,679,137 | A * | 7/1987 | Lane et al. | 700/83 |
| 7,207,031 | B2 * | 4/2007 | Reyna et al. | 717/105 |
| 2005/0060688 | A1 * | 3/2005 | Kamalakantha | 717/123 |
| 2005/0160411 | A1 * | 7/2005 | Sangal et al. | 717/144 |
| 2006/0142910 | A1 * | 6/2006 | Grier et al. | 701/29 |
| 2008/0155565 | A1 * | 6/2008 | Poduri | 719/320 |

OTHER PUBLICATIONS

CA Technologies Product Sheet "*CA Workload Automation ESP Edition*", Copyright 2011, 11 pages, Retrieved on Jan. 17, 2013 at http://www.ca.com/~/media/files/productbriefs/workload-automation-esp-edition-ps.aspx.

* cited by examiner

*Primary Examiner* — Craig Dorais
(74) *Attorney, Agent, or Firm* — Myers Bigel Sibley & Sajovec, P.A.

(57) ABSTRACT

Command methods for command driven computer systems present a list of command driven computer program products in response to activation of the command method, and present a logical tree including commands and related operands and sub-operands for a command driven computer program product in response to receiving a selection of the command driven computer program product from the list of command driven computer program products. The logical tree is presented in the same format for each of the command driven computer program products. The logical tree may be generated by obtaining a text file of a reference guide for the computer program product, identifying commands for the computer program product from the text file and creating lists of dependencies of the related operands and sub-operands for the computer program product. Related computer systems, methods and computer program products are disclosed.

18 Claims, 31 Drawing Sheets

```
IK55 ------------------------------------------------------------ ROW 1 COL 1 ----
COMMAND ===> pcmd
                                                              TA------------------

┌──────────────────────────────┐
        │ Row 100 to 112 of 290        │
        │                              │
        │ Page Mode    < Rotate        │
        │                abc....       │
        │                              │
        │     EXPEDITE                 │
        │     EXTJOB                   │
        │     FLOW                     │
        │     FOOTING                  │
        │     FROM                     │
        │     FTP                      │
        │     GENDOC                   │
        │     GENFLOW                  │
        │     GENPROJ                  │
        │     GENTIME                  │
        │     GO                       │
        │     GROUP                    │
        │     HARDCOPY                 │
        └──────────────────────────────┘
```

EXPEDITE Command: Define or Alter Expedite Policy.
EXPEDITE is relevant only with the WAEE Service Governor.
Use the EXPEDITE command to define or alter and expedite
policy. An Expedite policy specifies criteria that a job
must meet to be automatically expedited. The expedite
policy specifies how a job's priority should increase.
The criteria are OVERDUE (the job's start or end time is
overdue) and/or CRITICAL_PATH (the job is on the critical path).

BLUE = SAMPLE
WHITE = SAMPLE
GREEN = *SAMPLE*
RED = SAMPLE

FIG. 10D

```
IK55 ------------------------------------------------- ROW 1 COL 1 - - -
COMMAND ===> pcmd
-----------------------------------------

AGENTMSG . . agentname . . CONTROL SETPROPERTY PROPE      More: +
 RTY1 (log.level=) PERSISTENT(TRUE)
                                                          More: +
 s    PROPERTY1
 s    log.level=
        0
        1
        2
        3
        4
        5
 s    PERSISTENT
 s    TRUE
      FALSE
      RUN .
      DATA
      FILENAME=
        filename
```

BLUE = SAMPLE
WHITE = SAMPLE
GREEN = *SAMPLE*
RED = SAMPLE

FIG. 10J

```
IK55 ------------------------------------------------- ROW 1 COL 1 - - - -
COMMAND ===> pcmd AGENTMSG . , agentname . , CONTROL SETPROPERTY PROPE          More:  +
    RTY1 (log.level=3) PERSISTENT(TRUE)
                                                                  More:  +
    s     ☐   PROPERTY1
    s         log.level=
                  0
    s             1
                  2
    s             3
    s             4
                  5
              PERSISTENT
                  TRUE
                  FALSE RUN .
              DATA
                  FILENAME=
                      filename
                  ,LIBRARY=
```

BLUE = SAMPLE
WHITE = SAMPLE
GREEN = *SAMPLE*
RED = *SAMPLE*

FIG. 10K

```
Menu  Utilities  Compilers  Help
BROWSE    KOSIG01.JCLLIB(A) - 01.99              Line 00000000 Col 001 080
Command ===>                                                  Scroll ===> CSR
//CONFIG EXEC PGM=IKJEFT01,PARM='ISPSTART CMD(REFGUIDE)',              00090099
//       DYNAMNBER=25,                                                 00100099
//       REGION=3000K                                                  00110099
//SYSEXEC   DD DSN=KOSIG01.CNTLLIB,DISP=SHR                            00120099
//SYSTSPRT  DD SYSOUT=*,DCB=(LRECL=132,RECFM=FBA,BLKSIZE=1320)         00130099
//SYSPRINT  DD SYSOUT=*                                                00140099
//SYSTSIN   DD DUMMY                                                   00150099
//ISPPROF   DD DISP(NEW,DELETE),UNIT=3390,SPACE=(TRK,(1,1,1)),         00160099
//             DSORG=PO,DCB=(RECFM=FB,BLKSIZE=3120,LRECL=80)           00170099
//ISPPLIB   DD DISP=SHR,DSN=ISP.SISPPENU                               00180099
//ISPSLIB   DD DISP=SHR,DSN=ISP.SISPSENU                               00190099
//          DD DISP=SHR,DSN=ISP.SISPSLIB                               00200099
//ISPMLIB   DD DISP=SHR,DSN=ISP.SISPMENU                               00210099
//ISPTLIB   DD DISP=SHR,DSN=ISP.SISPTENU                               00220099
//ISPLOG    DD DUMMY                                                   00230099
//REFGUIDE  DD DISP=SHR,DSN=KOSIG01.ESP555P1.REFGUIDE                  00240099
//                                                                     00250099
//S1    EXEC PGM=IEFBR14                                               00260099
//DD1 DD DSN=KOSIG01.ESP555P1.REFLIB,DISP=(,CATLG),                    00270099
//       DCB=(LRECL=121,RECFM=FB,BLKSIZE=3146),DSORG=PO,DSNTYPE=LIBRARY, 00280099
```

BLUE = SAMPLE
WHITE = SAMPLE
GREEN = *SAMPLE*
RED = *SAMPLE*

FIG. 11A

| Menu  Utilities  Compilers  Help | |
|---|---|
| BROWSE    KOSIG01.JCLLIB(A) - 01.99                    Line 00000000 Col 001 080 | |
| Command ===>                                                        Scroll ===> CSR | |

***************************** Top of Data *********************************

ABENDLIM
ADJUST
AGENT
AGENT
AGENTMSG
AGENTRCV
ALERTDEF
ALTCAT
ALTEVENT
ALTGROUP
ALTSIG
ALTTJ
ALTUSER
APPLINS
APPLJOB(AJ)
APPLJOB(AJ)
AUX_AS
BKUPEVS
BKUPHIST

| BLUE = SAMPLE |
|---|
| WHITE = SAMPLE |
| GREEN = *SAMPLE* |
| RED = *SAMPLE* |

FIG. 11B

```
 Menu Utilities Compilers Help
───────────────────────────────────────────────────────────────────────────────
 BROWSE    KOSIG01.JCLLIB(A) - 01.99         Line 00000000 Col 001 080
 Command ===>                                            Scroll ===> CSR
********************************* Top of Data *********************************
AGENTMSG Command: Send Message to Agent
The AGENTMSG command issues commands and sends messages to Agents.
Type
General command
Authority
To issue the AGENTMSG command, you need to read access to the SAF resource:
system.AGENTMSG.verbsubverb.name
Syntax
AGENTMSG {date|.} {time|.} agentname {from|.} {objectname|.}
         verb subverb [((keyword)]
CONTROL
{CANCEL|CLRFILES|FLUSH|GETTRACEFILE|
 REFRESH Securtiy|
 SETINITS nnnn|
 SHUTDOWN|
 STATUS|
 MGRADDR PORT(number) ADDRESS(address) [PERSISTENT(TRUE|FALSE)]|
 SETPROPERTY PROPERTY1(log.level+{0|1|2|3|4|5})
  [PERSISTENT(TRUE|FALSE)]
```

BLUE = SAMPLE
WHITE = SAMPLE
GREEN = *SAMPLE*
RED = *SAMPLE*

FIG. 11C

COMMAND PRESENTATION AND GENERATION SYSTEMS, METHODS AND COMPUTER PROGRAM PRODUCTS USING LOGICAL TREES

BACKGROUND

Various embodiments described herein relate to computer systems, methods and program products, and more particularly to command driven computer systems, methods and program products.

Command driven computer systems, methods and program products are widely used for user interaction with a computer. In command driven systems, methods and program products a user or other client issues commands to a computer program product in the form of successive lines of text, also referred to as command lines. Alternatives to command driven user interfaces include, but are not limited to, menu driven user interfaces and various desktop metaphors centered on a pointer, usually controlled with a mouse.

Historically, command driven user interfaces were the earliest techniques for user interaction with mainframe or enterprise computer programs. Command driven user interfaces were also used as the primary user interaction with many other early operating systems including MS-DOS, CP/M, UNIX and Apple DOS. A command driven interface may be implemented with a command line shell, which is a program that accepts commands as text input and converts the commands to appropriate operating system functions. The commands may be input in a command line or may be provided as a series of statements using programming languages such as COBOL, C, etc.

Presently, command driven interfaces are less widely used by casual users, who generally favor graphical user interfaces. However, command driven interfaces are still often preferred by more advanced computer users, as they can provide a more concise, flexible and powerful technique to control a computer.

A command driven computer program product will generally include a large number of commands, each of which may include one or more operands, sub-operands and parameters. The syntax of the command, operands, sub-operands and parameters is typically rigidly defined by a "reference guide" for the computer program product. Whether online or hard copy, the reference guide provides the details for each command and the operands, sub-operands and parameters which must be met for the command to be effective. Other tools may be used to flag errors in a command as it is being generated.

BRIEF SUMMARY

Command methods for command driven computer systems according to various embodiments described herein may present a list of command driven computer program products in response to activation of the command method and may present a logical tree comprising commands and related operands and sub-operands for a command driven computer program product in response to receiving a selection of the command driven computer program product from the list of command driven computer program products. The logical tree may also include related parameters for the commands. The logical tree comprising commands and related operands and sub-operands, and in some embodiments parameters, is presented in the same format for each of the command driven computer program products in the list of command driven computer program products. Accordingly the identification and building of commands for many computer program products may be facilitated using the common logical tree format.

The logical tree may be presented so as to facilitate user selection of a command and may also facilitate building of a command based on user selection of a command and its related operands, sub-operands and in some embodiments, parameters. In some embodiments, operands, sub-operands and parameters that are unavailable for selection, and operands, sub-operands and parameters that are available for selection may be identified, for example using different colors, fonts, sizes or line types (e.g., solid, dashed, dotted) in response to receiving a selection of the command driven computer program product from the list of command driven computer program products. Moreover, in response to a selection of an operand, sub-operand or parameter in the logical tree, other operands, sub-operands and parameters that become unavailable for selection may be identified, for example using different colors, fonts, sizes, line types or other identification on a display.

In other embodiments, other operands and sub-operands that are required are identified in response to receiving the selection of an operand or sub-operand in the logical tree. Moreover, other operands, sub-operands and parameters that are mutually exclusive to a selected operand, sub-operand or parameter may also be identified in response to receiving the selection of the operand or sub-operand in the logical tree. In other embodiments, parameters that can be overwritten and parameters that have predefined values may also be identified in response to selection of a command driven computer program product. Moreover, other parameters that are unavailable for selection and/or parameters that are available for selection may be identified in response to receiving a selection of an operand, sub-operand or parameter in the logical tree.

In any of the above identified embodiments, the command may be built in response to receiving a selection of an operand, sub-operand or parameter in the logical tree. Thus, the command may be built dynamically in response to a series of selections. After the command is built, the command may be executed in response to receiving an execution command, for example by receiving selection of "enter" on a user terminal.

Prior to presenting the logical tree according to any of the embodiments described above, the logical tree may be generated. Various embodiments described herein can provide systems, methods and computer program products for generating a logical tree comprising commands, related operands, sub-operands and parameters for the command driven computer program product. In some embodiments the logical tree may be generated by obtaining a text file of a reference guide for the command driven computer program product, identifying commands for the command driven computer program product from the text file of the reference guide and creating lists of dependencies of the related operands, sub-operands and parameters for the command driven computer program product, that were identified from the text file of the reference guide.

In some embodiments the lists of dependencies may be created by creating a list of mutually exclusive and co-requisite operands and sub-operands for the commands. In other embodiments, a list of exceptions is also created that identifies conditional dependencies that are not covered by the list of mutually exclusive and co-requisite operand and sub-operands for the command. The logical tree may then be created from the lists of dependencies that were generated.

Computer systems, methods and computer program products according to various embodiments described herein may generate the logical tree by generating lists of dependencies and they may also present the logical tree for command generation. Other embodiments, however, may create the lists of dependencies for use in analyzing commands, separate and apart from their use to generate a logical tree. Yet other embodiments may present the logical tree using predefined relationships among commands, operands, sub-operands and parameters, independent of their generation from lists of dependencies.

It will also be understood that various embodiments have been described above in connection with command methods. However, various other embodiments described herein can provide analogous command driven computer systems and command driven computer program products.

It is noted that aspects described herein with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

The accompanying drawings, which are included to provide a further understanding of the present disclosure and are incorporated in and constitute a part of this application, illustrate certain embodiment(s). In the drawings:

FIGS. 10A-10K illustrate user displays that may be displayed on a user terminal by command presentation systems, methods and computer program products according to various embodiments described herein.

FIGS. 11A-11C illustrate other user displays that may be displayed on a user terminal by command generation systems, methods and computer program products according to various embodiments described herein.

DETAILED DESCRIPTION

Embodiments of the present disclosure will be described more fully hereinafter with reference to the accompanying drawings. Other embodiments may take many different forms and should not be construed as limited to the embodiments set forth herein. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the various embodiments described herein. As used herein, the term "and/or" includes any and all combinations of one or more of the associated listed items.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof. Elements described as being "to" perform functions, acts and/or operations may be configured to or other structured to do so.

Unless otherwise defined, all terms (including technical and scientific terms) used herein have the same meaning as commonly understood by one of ordinary skill in the art to which various embodiments described herein belong. It will be further understood that terms used herein should be interpreted as having a meaning that is consistent with their meaning in the context of this specification and the relevant art and will not be interpreted in an idealized or overly formal sense unless expressly so defined herein.

Figure 1:
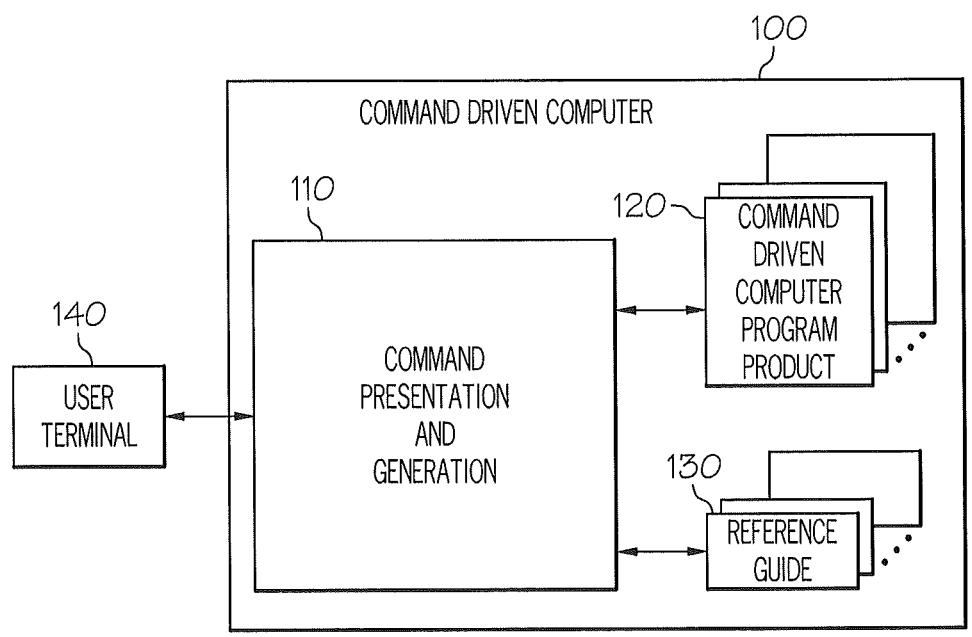
FIGS. 1 and 2 are block diagrams of command presentation and generation systems, methods and computer program products according to various embodiments described herein.

FIG. 1 is a block diagram of command driven computer systems, methods and computer program products according to various embodiments described herein. Referring to FIG. 1, the command driven computer systems, methods, and computer program products 100 may be embodied in a standalone unit or may be contained as part of other computing infrastructure such as a client-server and/or cloud computing environment. The command driven computer systems, methods and computer program products 100 may be embodied as one or more enterprise, application, personal, pervasive and/or embedded computer systems that are operable to receive, transmit, process and store data using any suitable combination of software, firmware and/or hardware and that may be standalone or interconnected by any conventional, public and/or private, real and/or virtual, wired and/or wireless network including all or a portion of the global communication network known as the Internet, and may include various types of tangible, non-transitory computer readable medium. The command driven computer systems, methods and computer program products 100 may also include a network transceiver, processor, memory and/or other circuitry.

Still referring to FIG. 1, the command driven computer system, method and/or computer program product 100 includes a command presentation and generation system, method and/or computer program product 110 according to various embodiments described herein. The command presentation and generation system, method and/or computer program product 110 provides a tool for one or more users at one or more user terminals 140 to understand, experiment with and/or generate commands for a command driven computer system, method and/or computer program product 120. The command presentation and generation system, method and/or computer program product 110 can provide a common interface for allowing a user to interact with a plurality of command driven computer program products 120, that can be more efficient than using the associated reference guides or manuals 130 for a respective command driven computer program product 120.

It will be understand that the user terminal 140 may generally range from desktop, notebook, netbook, laptop, smart phone, and/or any other user device and may be connected to the command driven computer 100 via a direct wired or wireless connection or by any conventional, public and/or private, real and/or virtual, wired and/or wireless network including the Internet. Although a single user terminal 140 is shown in FIG. 1, multiple user terminals may be provided.

The command driven computer program product 120 may be any enterprise, application, personal, pervasive and/or embedded computer program product that is operable to receive, transmit, process and store data using any combination of software, firmware and/or hardware using a command driven interface. The reference manuals 130 may be provided in hard copy and/or online. In general, a command driven computer program product 120 may have on the order of hundreds or more separate commands, each of which may include many operands, sub-operands and parameters that are interrelated and that are defined by a formal syntax. The reference guides may be up to hundreds or more pages long. As but one example CA, Inc., the assignee of the present application, markets an enterprise computer program product named "CA Workload Automation ESP Edition" which allows an enterprise to simplify cross-platform workload scheduling and management. This computer program product is described in a product sheet entitled "Product Sheet CA Workload Automation ESP Edition", © 2011. This computer program product includes over 700 commands and the reference guide is over 1650 pages long. CA Workload Automation ESP Edition is an example of one of many command driven computer program products that may be used within an enterprise.

Additional discussion of various embodiments of FIG. 1 will now be provided. In particular the enterprise software industry has accumulated many operating systems, sub-systems and product related commands. Command usage has become extremely important throughout an enterprise and it is desirable to accelerate the pace of command usage to match the newest technology. Relying on the product reference guide is often not sufficient, even for sophisticated users. Some command driven computer program products already have an "in place help" capability. This "in place help" may allow searching of an online reference guide to find a command. Tools may even be provided to assist the user in avoiding erroneous syntaxes. Even with such rudimentary tools, however, it is difficult for users, even sophisticated users, to manipulate and generate commands for a wide variety of command driven computer program products.

For example, IBM "Dreamweaver" provides in place help. Moreover, IBM BookManager and QuickReference QW allows a command/operand description to be located within an online reference manual. However, these products do not facilitate making decisions or building and execution of a command. These products may provide a fast locator but the allocated help leaves it up to the user to read the product manual. Other products may have their own online help and command generation tools but they generally do not cover an entire command pool or they do not provide the ability to provide a quick search hyperlink or in place help.

In sharp contrast, command presentation and generation systems, methods and/or computer program products 110 according to various embodiments described herein can present a list of command driven computer program products in response to activation of the command presentation and generation systems, methods and/or computer program products 110 and can present a logical tree comprising commands and related operands, sub-operands and parameters for a command driven computer program product, in response to receiving a selection of the command driven computer program product from the list of command driven computer program products. The logical tree may have the same format for each of the command driven computer program products in the list. The logical tree may allow insight into a given command driven computer program product's command set, the respective operands for the respective commands, the sub-operands for the respective operands and the parameters for the operands and sub-operands. Moreover, the logical tree can dynamically indicate operand and parameter dependencies as a given operand, sub-operand or parameter is selected.

The CA ESP Workload Automation PCMD Tool has implemented some of these functionalities for one product, which is ESP itself. However, there is no automatic process of command pool generation and regeneration. In sharp contrast, various embodiments described herein can provide a single command accessing center for command presentation and generation that can provide unique command presentation methods that can allow automatic command pool creation and regeneration. Various embodiments described herein can also provide online command help and generation for multiple command driven computer program products and can provide a single access point to process any command from a multi-product command pool.

Figure 2:
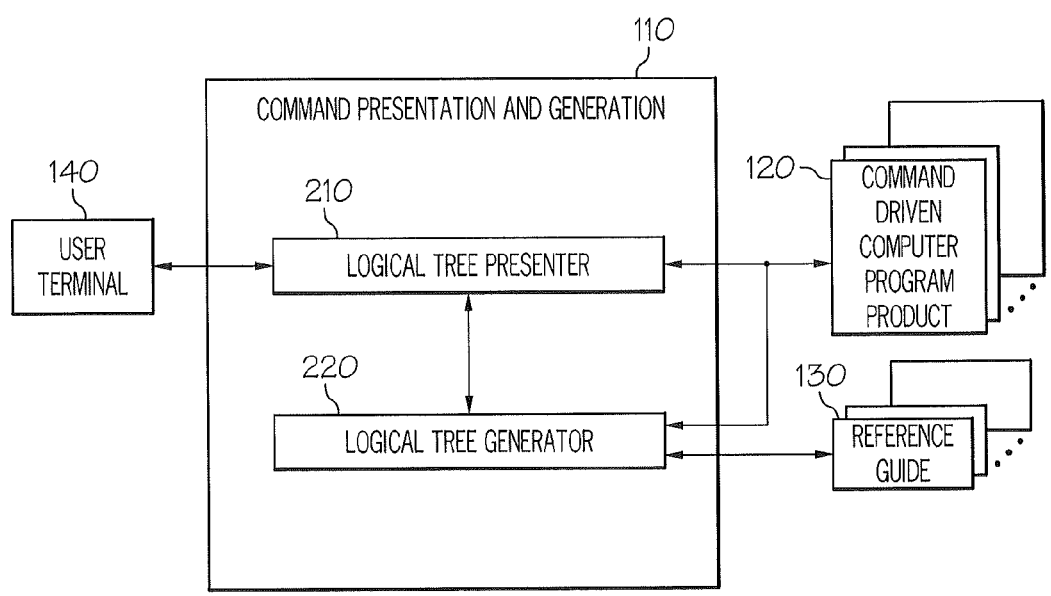

FIG. 2 is a block diagram of a command presentation and generation tool such as the command presentation and generation system, method and computer program product 110 of FIG. 1, according to various embodiments described herein. Referring to FIG. 2, the command presentation and generation system, method and/or computer program product 110 includes a logical tree presenter 210 and a logical tree generator 220. The logical tree presenter 210 presents a logical tree comprising commands and related operands and sub-operands, and in some embodiments related parameters, for a command driven computer program product, in response to receiving a selection of the command driven computer program product 120 from a list of command driven computer program products. The logical tree presenter 210 also dynamically indicates the relationship among the commands, operands, sub-operands and parameters, as a specific command, operand, sub-operand and/or parameter is selected by the user. The logical tree presenter 210 may also be used to build a command and to execute or insert the command that was built on the appropriate command driven computer program product 120.

The logical tree generator 220 is used to generate the logical tree that is presented by the logical tree presenter 210 from the reference guide or manual 130, by identifying commands for the command driven computer program product 120 from a text file of the reference guide 130 and by creating lists of dependencies of the related operands, sub-operands and for some embodiments parameters, for the command driven computer program product. Various embodiments of the logical tree presenter 210 and the logical tree generator 220 will now be described.

Figure 3:
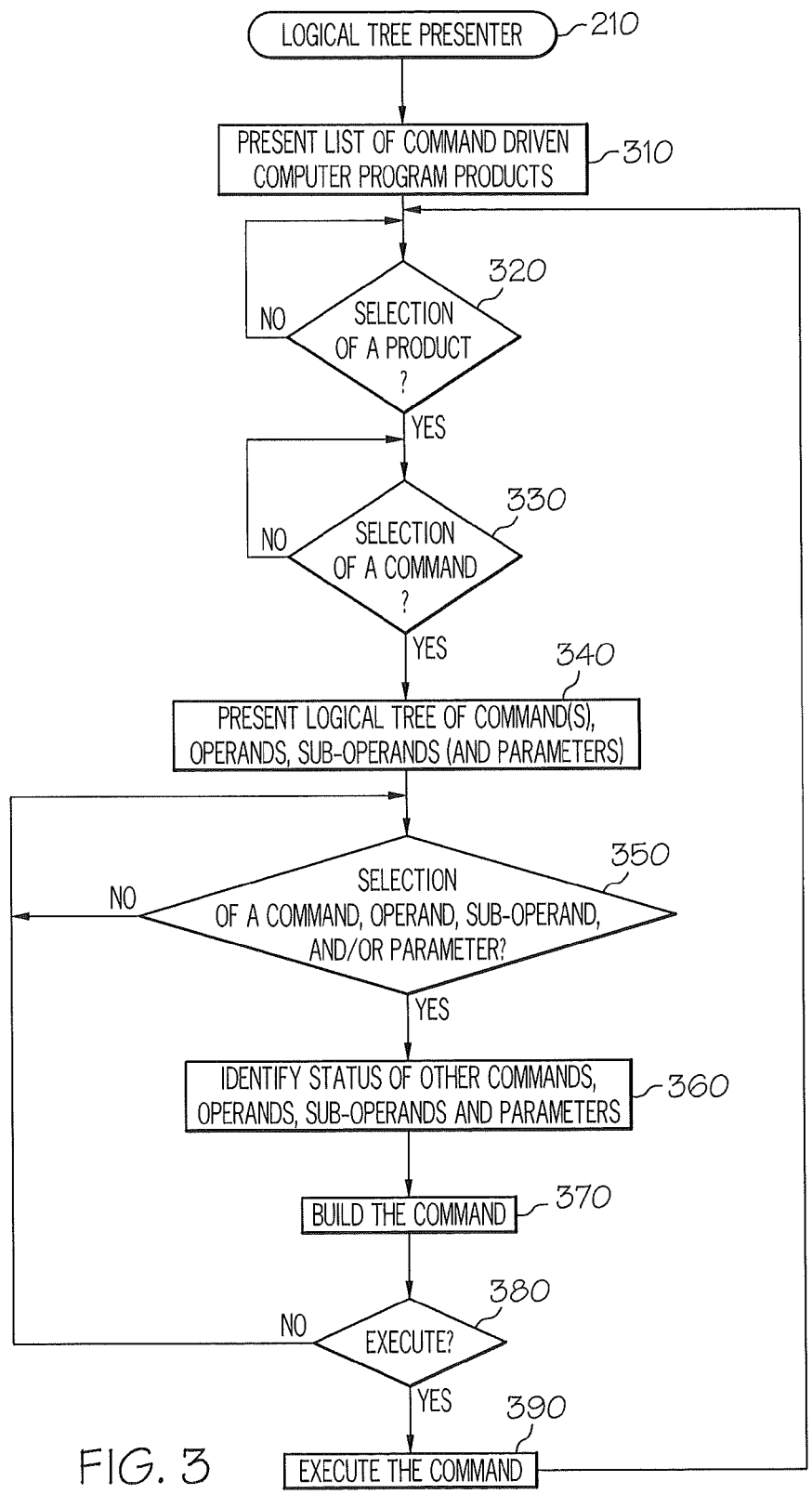
FIGS. 3-9 are flowcharts of operations that may be performed by command presentation and generation systems, methods and computer program products according to various embodiments described herein.
Figure 10A:
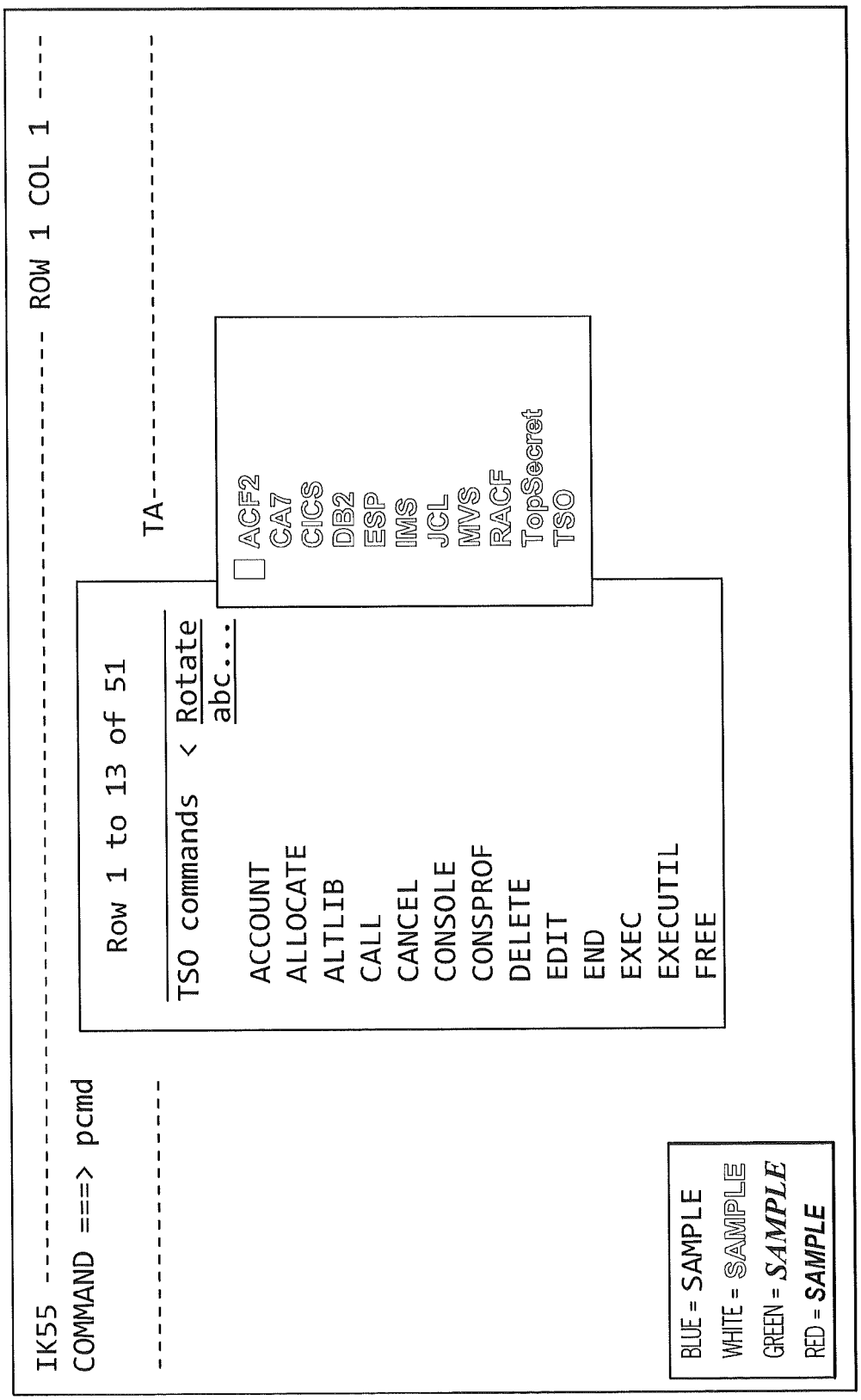

FIG. 3 is a flowchart of operations that may be performed by a logical tree presenter, such as the logical tree presenter 210 of FIG. 2, according to various embodiments described herein. Referring to FIG. 3, at Block 310, a list of command driven computer program products is presented in response to activation of the logical tree presenter 210. FIG. 10A illustrates a display of a user terminal, such as the user terminal 140 of FIGS. 1 and 2, that lists a plurality of command driven computer program products (ACF2, CA7, CICS, etc.). It will be understood that fewer or more computer program products may be presented in the list, depending upon the availability of these command driven computer program products to a given user in an enterprise.

It will be understood that the list of command driven computer program products may be presented directly or indirectly in response to activation of the logical tree presenter 210. For example, in FIG. 10A the list of command driven computer program products that are available may be presented directly upon activation of the logical tree presenter 210. Alternatively, as illustrated in FIG. 10A, upon activation of the logical tree presenter 210 the list of commands for the last used product (TSO in this case) may be displayed. Activation of the "Rotate" field of FIG. 10A may provide the list of available command driven computer program products in a pop up window as illustrated in FIG. 10A.

It will also be understood that in user displays corresponding to FIGS. 10A-10K and 11A-11C, different colors may be used to indicate different selections, actions or relationships. In the black and white drawings of these figures, different fonts will be used to indicate different colors, as shown in the legend of each figure. In other embodiments, however, different colors, fonts, sizes, line types or other differentiators that are commonly used on user displays, may be used to indicate different selections, actions or relationships.

Referring back to FIG. 3, at Block 320 a selection of a computer program product is obtained, for example from a user terminal 140. For example, in FIG. 10A the computer program product ESP is selected.

Figure 10B:
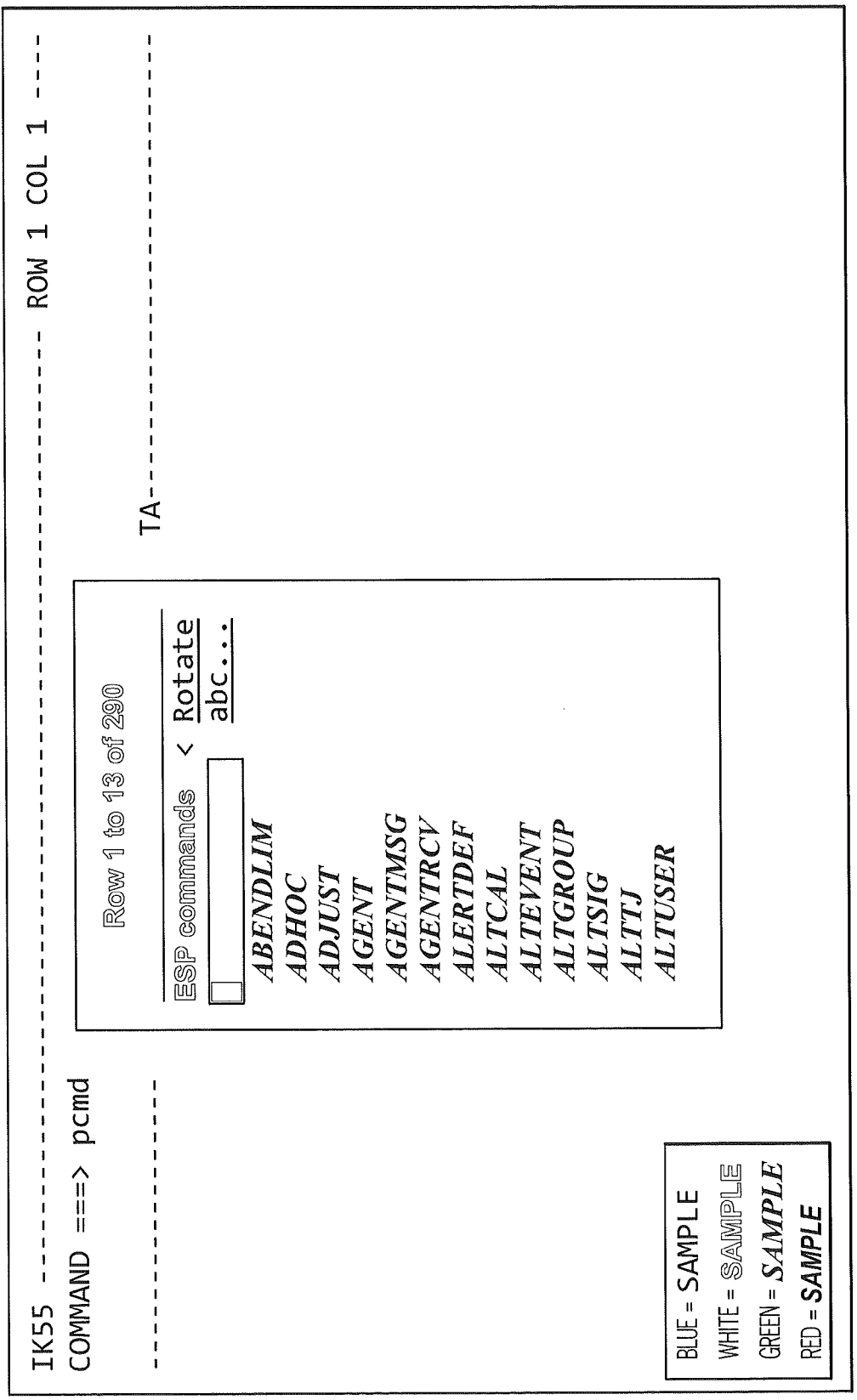
Figure 10C:
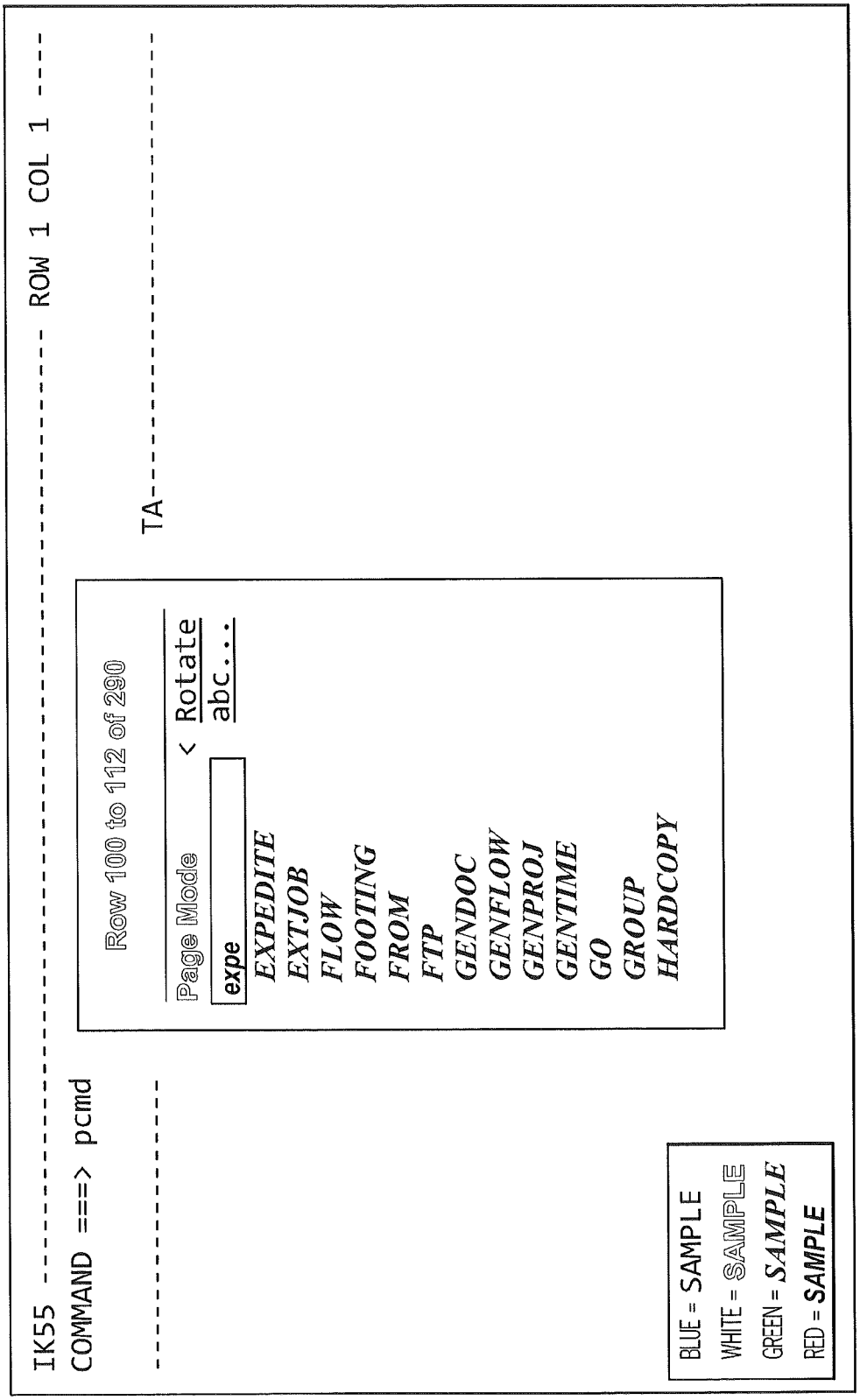
Figure 10E:
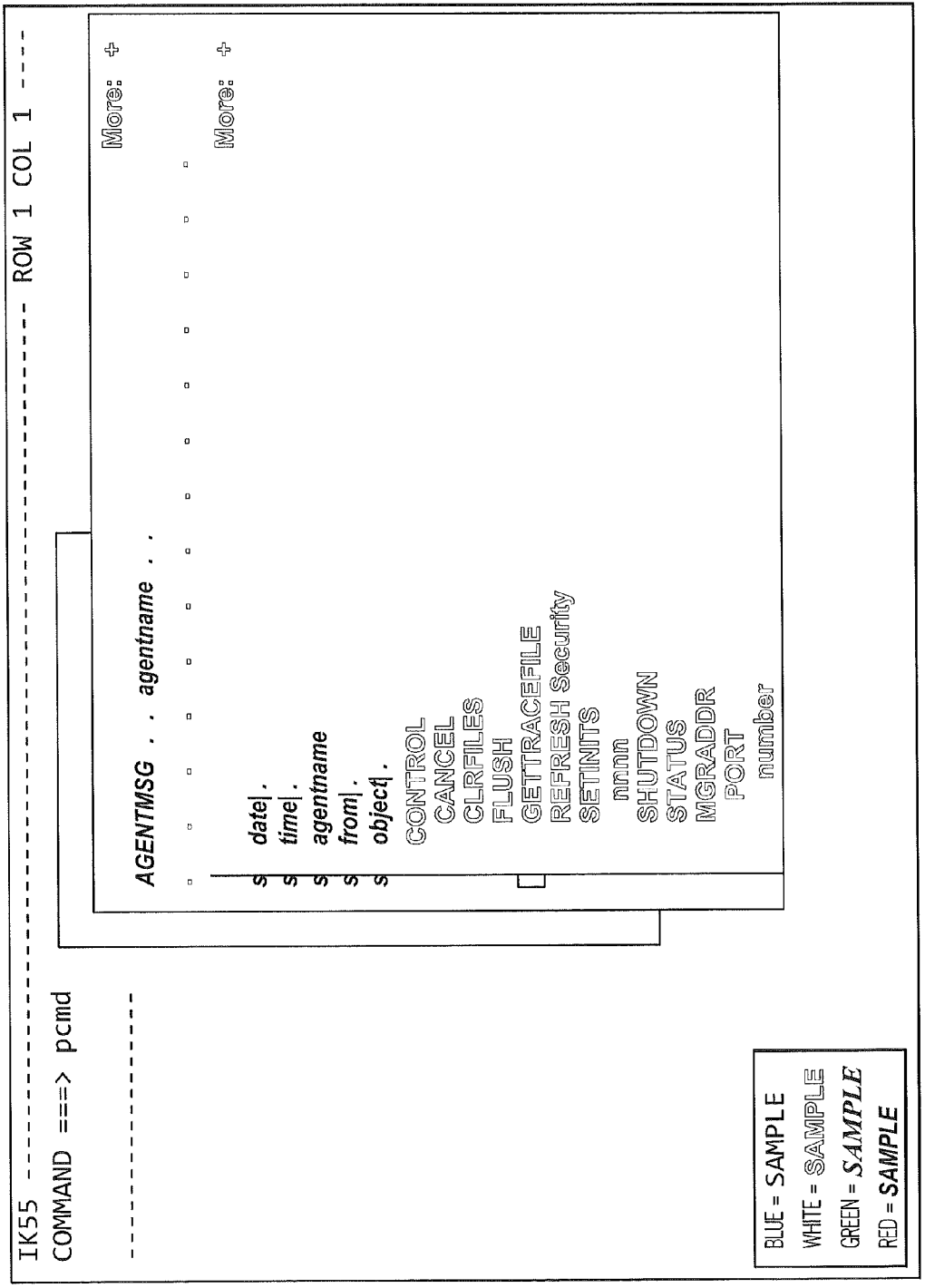

Still referring to FIG. 3, upon selection of a computer program product at Block 320, a list of commands for the computer program product may be displayed as shown in FIG. 10B. The display may allow a quick search for a given command as shown in FIG. 10C, and may also allow for a command description as shown in FIG. 10D, for example, by pressing a Programmable Function (PF) key such as the "PF1" key. Then, upon selection of a command from the display of FIG. 10B, 10C or 10D at Block 330 of FIG. 3, a logical tree of the command, the command's operands, sub-operands and in some embodiments, the command's parameters is presented at Block 340 as illustrated in FIG. 10E. The command is displayed as a logical tree of all of the command's operands and sub-operands, and in some embodiments parameters.

It will be understood that the logical tree may be presented only for a selected command in response to selection of a command at Block 330 as illustrated in FIG. 10E. However, in other embodiments, upon selection of a product at Block 320 a logical tree of all of the product's commands and the related operands, sub-operands, and in some embodiments parameters, may be displayed in a logical tree. The logical tree may be scrolled up or down. Finally, it will be understood that the term "sub-operands" encompasses more than one level of sub-operand; i.e. sub-sub-operands, etc.

Additional discussion of the logical tree of FIG. 10E will now be provided. As used herein, a "logical tree" indicates a hierarchical organization of one or more commands and the command(s) related operands, sub-operands, sub-sub-operands, etc. and/or parameters. FIG. 10E illustrates how a logical tree may be provided for the "AGENTMSG" command of the ESP computer program product. As shown, indentations akin to sub-folders are used to indicate a hierarchical relationship of the various operands, sub-operands and parameters related to the AGENTMSG command. It will be understand, however, that other graphical presentation techniques may be used including node/branch representations, organization diagram type representations and/or other representations.

Figure 10F:
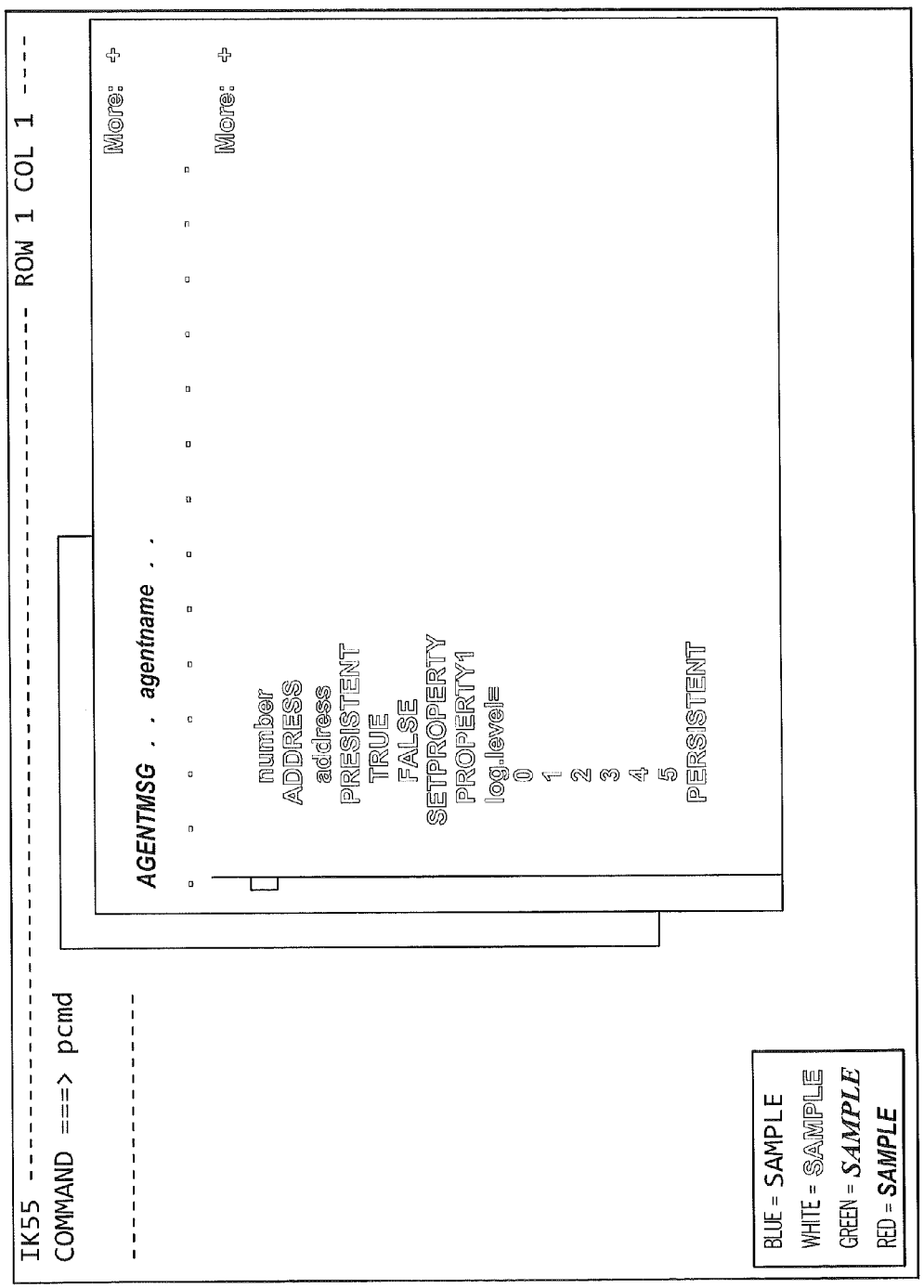
Figure 10G:
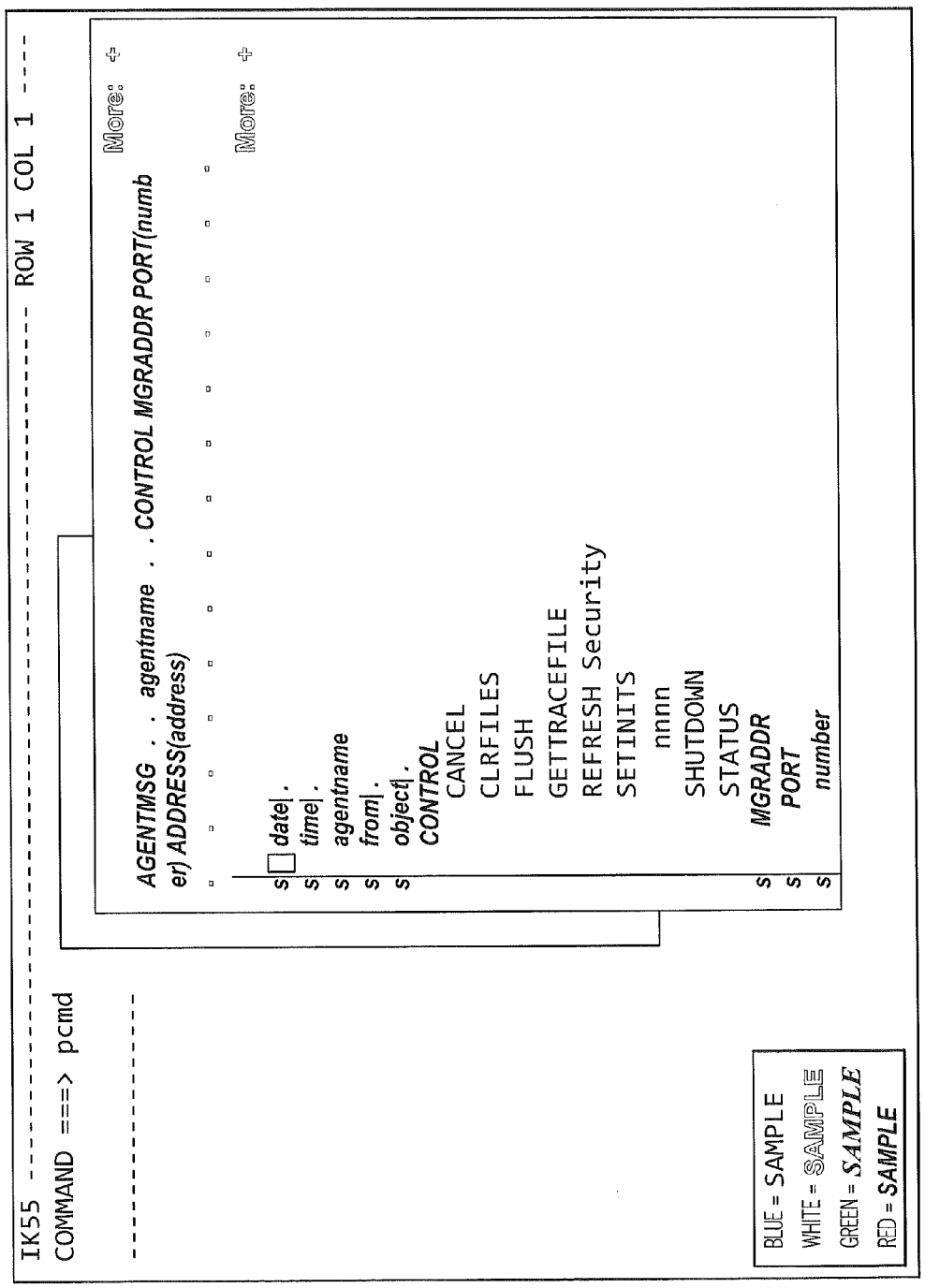

The presentation technique of FIG. 10E, including indentations to indicate different levels of commands, operands and parameters may be used efficiently in a command driven environment where a command can be presented in a logical tree on a single panel. For example, FIG. 10F illustrates how scrolling down on the command AGENTMSG can reveal all the command operands. Thus it can be seen, for example, that the AGENTMSG command has a first (of three) major operands named "CONTROL". Moreover, the CONTROL operand has numerous sub-operands including "CANCEL", "CLRFILES", "FLUSH", etc. Moreover, the sub-operand "MGRADDR" also has sub-sub-operands, "PORT", "ADDRESS" and "PERSISTENT". This common logical tree format may be used to represent any command of any command driven product in the list of products, for example that was shown in FIG. 10A.

Moreover, as shown in FIGS. 10E and 10F, an identification may be provided to identify other operands and sub-operands that are unavailable for selection and other operands and sub-operands that are available for selection, in response to receiving a selection of an operand or sub-operand in the logical tree. For example, in FIGS. 10E and 10F, all operands in white color are available for selection whereas required operands are pre-selected in red color.

Referring back to FIG. 3, upon presentation of a logical tree for a given command or a group of commands at Block 340, user selection of a given command, operand, sub-operand and/or parameter may take place at Block 350. In response, at Block 360 the logical tree changes to identify the status of other commands, operands, sub-operands and parameters, so that the user can understand the implication of the selection of Block 350. Additional details of identifying the status at Block 360 will now be described in connection with FIG. 4.

Figure 4:
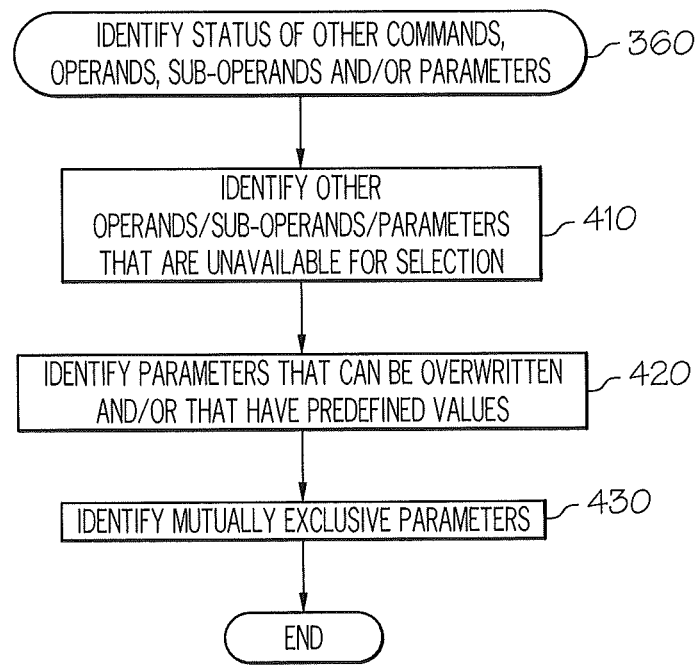

Referring now to FIG. 4 at Block 410, in response to selection of a given command, operand, sub-operand and/or parameter, other operands, sub-operands and/or parameters that are unavailable for selection are identified. For example, referring to FIG. 10G, upon selection of the operand "MGRADDR", all of this operand's other parameters are selected automatically and are indicated in one color, for example red. Thus, "PORT" is selected automatically. Unavailable operands, sub-operands and parameters become protected and are indicated in another color, for example blue. Thus operands, sub-operands and/or parameters that are mutually exclusive with a selected operand, sub-operand and/or parameter are identified, for example in blue.

Figure 10H:
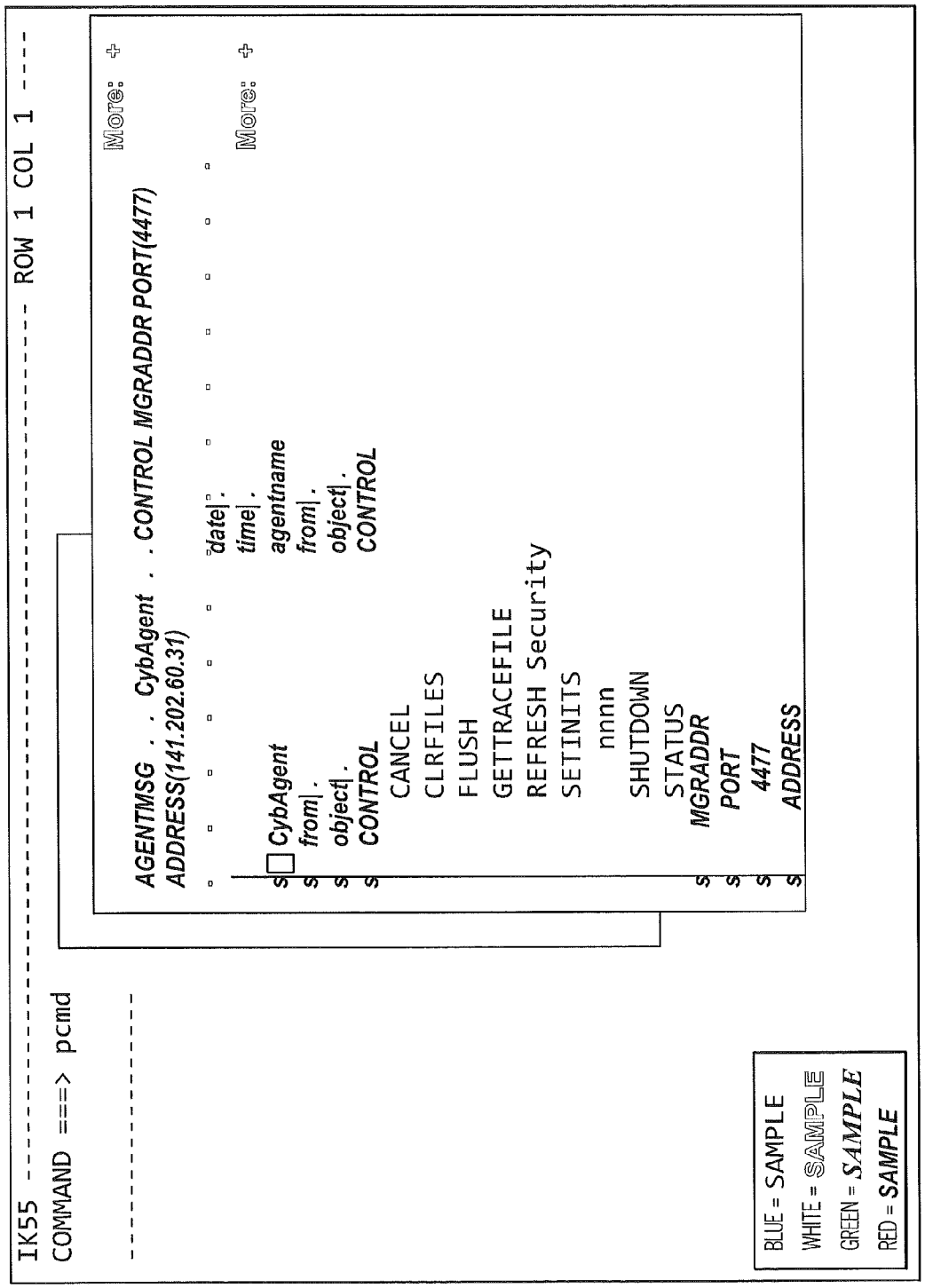

Referring to Block 420, in other embodiments, in response to selection of a command, operand, sub-operand and/or parameter, parameters that can be overwritten and/or that have predefined values are also identified. In FIG. 10H, fields in lower case which allow updates may be identified. Those fields must be substituted (overwritten). For example, "agentname" has been substituted by "CybAgent"; "number" substituted by "4477"; and "address" by "141.202.60.31". An exception rule applies to lower case operands that include a placeholder. In these cases, for example "date|.", if no input is explicitly provided (no date typed over this field), the placeholder will be substituted as a predefined value.

Figure 10I:
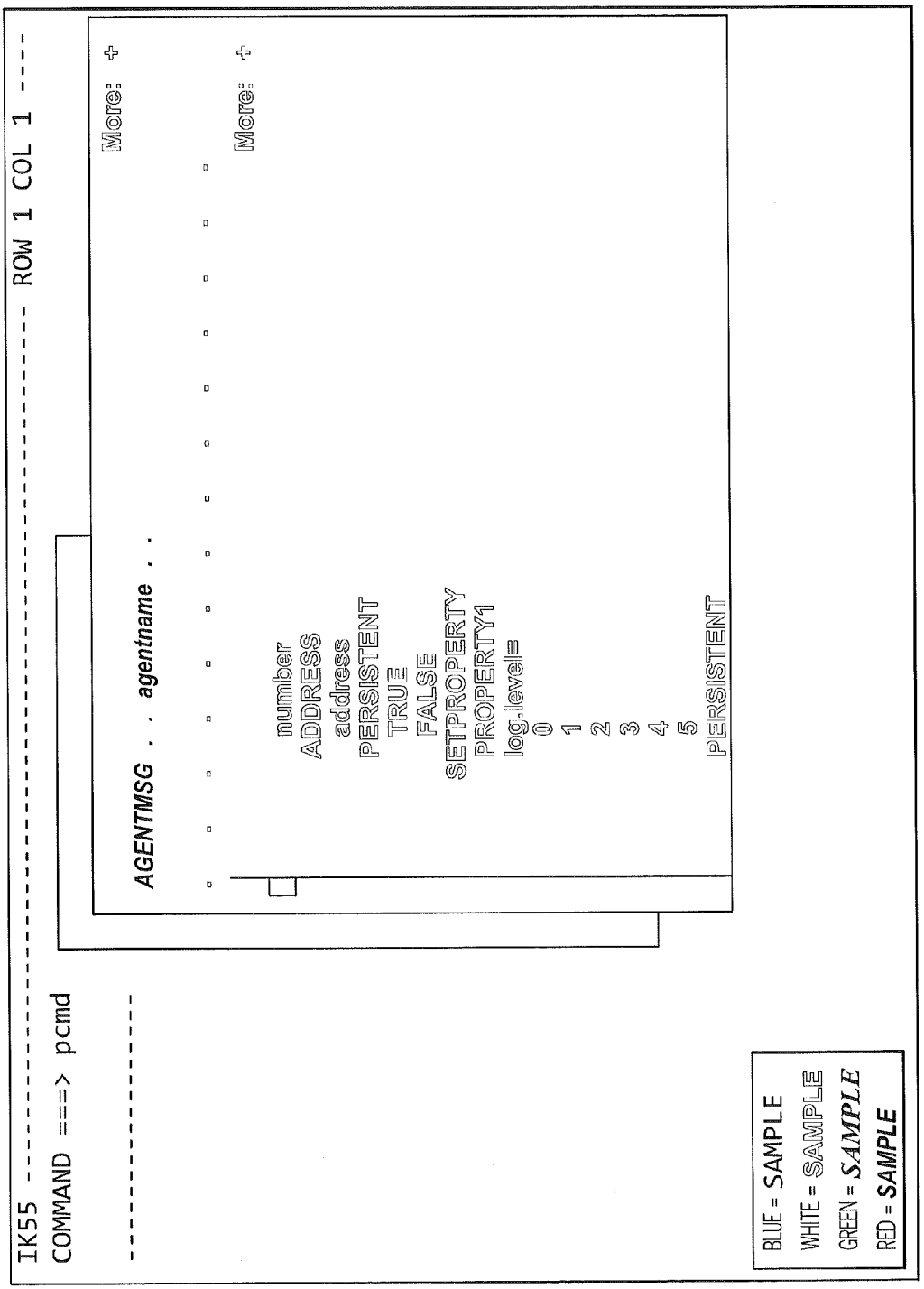

Moreover, referring to FIG. 10I, a "refresh" or "deselect" option may be presented to display the original command panel so as to eliminate all or the changes that were made, by deselecting an already selected operand. For example, pressing the PF6 key will refresh and display the original command panel, while again verifying and reviewing all the requested selections. An "undo" function may also be provided to undo an immediately preceding action. For example, selecting the PF6 key (or pressing the PF3 key and reselection of the same command) can provide an "undo".

Referring now to Block 430, if a given selection at Block 350 requires mutually exclusive options, these mutually exclusive options may also be identified. For example, referring to FIG. 10J, if selection of the operand "TRUE" requires mutually exclusive options (log.level={0|1|2|3|4|5}) the user is notified and those options will be displayed in green color. Moreover, if TRUE is selected, FALSE is indicated as being unavailable (blue color) and RUN is also indicated as not available (blue color). However, the log levels are indicated in green to indicate that a selection is needed. FIG. 10K illustrates selection of a log level of "3" (red color) and an indication (blue color) that log levels 0, 1, 2, 4 and 5 are unavailable.

Referring back to FIG. 3, as the status of other commands, operands, sub-operands and parameters is identified at Block 360, the command may be dynamically built at Block 370. Thus, for example, FIGS. 10H, 10I, 10J and 10K illustrate dynamic building of the "AGENTMSG" command at the top of the figure as the various user selections are made at Block 350.

Still referring to FIG. 3, once the command is built at Block 370 it may be executed/inserted at Block 390 in response to receiving an execution command or confirmation at Block 380. For example, the command that was built in FIG. 10J may be executed by selecting the "ENTER" key. Alternatively, the "PF3" key may be activated to cancel and cut the commands to the keyboard.

In summary, identifications may be provided of the status of the various commands, operands, sub-operands and parameters using color or other identifications. For example, red may be used to indicate mandatory or already selected commands, operands, sub-operands and/or parameters. Blue may be used to indicate commands, operands, sub-operands and/or parameters that are protected from selection or otherwise not available, for example, due to being mutually exclusive with another selection. White may indicate commands, operands, sub-operands and/or parameters that are available for selection. Green may be used to indicate operands that are available for selection, and that are mutually exclusive. Specifically, green may be used to indicate operands that are required and, as such, are available for selection, but some clarification is still needed. For example, they are required, but are mutually exclusive, as in the above log.level example where only one sub-operand must be selected. In another example, there are optional operands, but at least one of them has to be selected: {[a] [b] [c]}. In other words, for a group of operands whose selection is required, but is unclear and still has to be clarified, the green color may be used.

Figure 18:
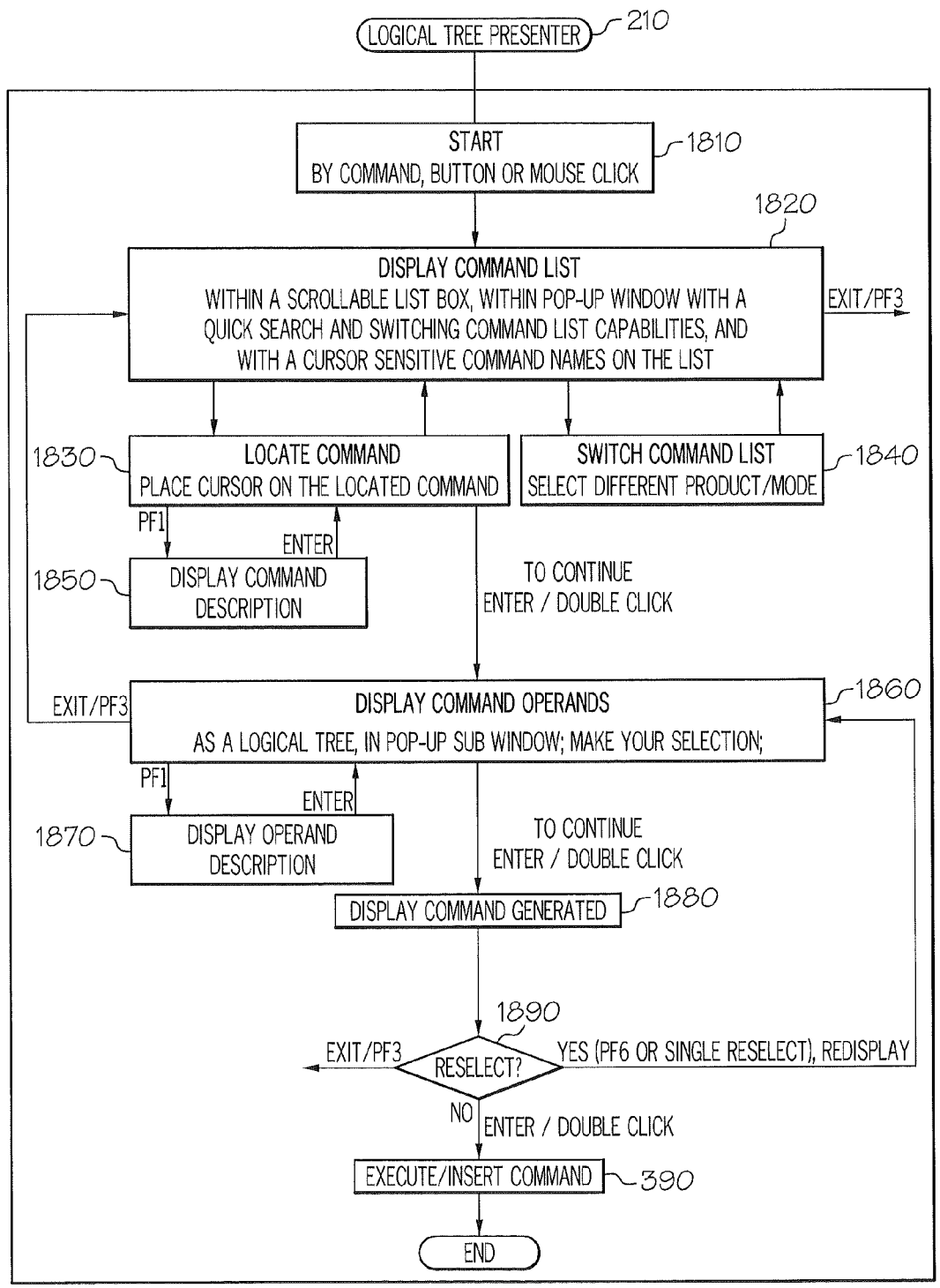
FIG. 18 is a flowchart of other operations that may be performed by command presentation systems, methods and computer program products according to various embodiments described herein.

FIG. 18 is a more detailed flowchart of operations of a logical tree presenter, which may correspond to Block 210 of FIG. 2.

Referring now to FIG. 18, at Block 1810 the logical tree presenter is started using a command, activating a button or by mouse click. At Block 1820, the command list is displayed, which may correspond to Block 340 of FIG. 3. The command list may be displayed within a scrollable list box, in a pop up window and with quick search and switching command list capabilities. A cursor may be provided that is sensitive to command names on the list.

Block 1830 allows a "quick search" to be performed by placing a cursor on the located command or by entering the first few letters of a command. In response, the command description will be displayed at Block 1850 as was illustrated at FIG. 10D. The PF1 key can be used to display the command description of Block 1850 and the "Enter" key may be used to remove the command description, as was already described. Moreover, at Block 1840, a different product or mode may be selected by, for example, selecting the "Rotate" field as was already explained in connection with FIG. 10A.

Referring again to Block 1830, once the command is located, operations may continue, for example by selecting "Enter" or by double clicking to display the command operands at Block 1860. As was already illustrated in FIG. 10E, and was described in connection with Block 340, logical tree may be displayed in a pop up window and allow a selection to be made. Again, at Block 1870 the operand description may be displayed and removed at any time.

When a selection of a command operand is made at Block 1860, which may correspond to Block 350 of FIG. 3, the command that is generated may be displayed at Block 1880, which may correspond to Block 370 of FIG. 3. A single operand select/deselect action followed by activation of "Enter" at Block 1890 returns to Block 1860. The PF6 key may also be used to deselect all actions and return to Block 1860. Exiting may take place at any time by activating the PF3 key as was already described. Finally, at Block 390 the command can be executed/inserted as was already described.

FIGS. 3 and 18 assume that the logical tree already existed. Various embodiments of a logical tree generator, for example the logical tree generator 220 of FIG. 2, will now be described. This logical tree generator may generate the logical tree that is used by the logical tree presenter 210 of FIG. 2 and/or may generate a logical tree for other purposes independent of the logical tree presenter 210 of FIG. 2.

Figure 5:
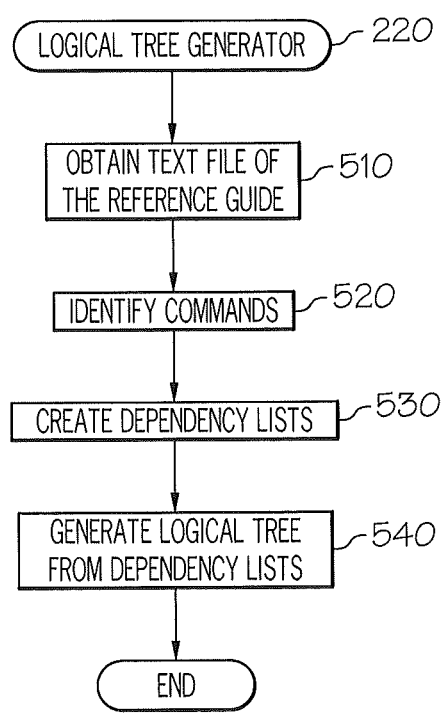

FIG. 5 is a flowchart of operations that may be provided by a logical tree generator, such as a logical tree generator 220 of FIG. 2. Referring to FIG. 5, at Block 510 a text file of the reference guide, such as the reference guide 130 of FIG. 1, for the command driven computer program product, such as the command driven computer program product 120 of FIG. 1, is obtained. Then, at Block 520, the commands are identified and captured. Dependency lists, and in some embodiments operand descriptions, are then created for each command at Block 530. Finally, at Block 540, the logical tree is generated from the dependency lists. It will be understood that the "lists" described herein may be represented in any format, such as tables, linked lists, etc.

Operations of Blocks 510-540 according to various embodiments described herein will now be described in more detail.

Figure 6:
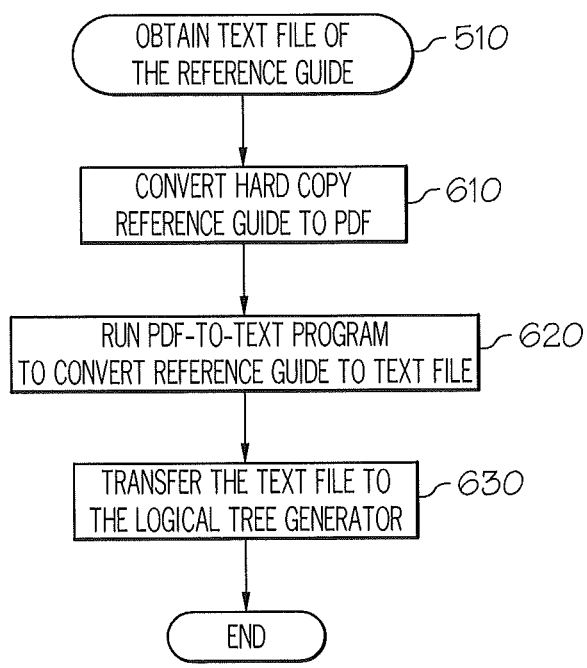

FIG. 6 is a flowchart of operations that may be performed to obtain a text file of a reference guide, which may correspond to Block 510 of FIG. 5. Referring to FIG. 6, the reference guide 130 may only exist in hard copy format. If this is the case, at Block 610 the hard copy reference guide may be converted to, for example, PDF format. Then, at Block 620, a PDF-to-text program is run to convert the PDF of the product reference guide to a text file. At Block 630, the text file is then transferred to the logical tree generator 220, for example using File Transfer Protocol (FTP).

It will be understood that operations of FIG. 6 may need not be performed if the text file is already available.

Figure 7A:
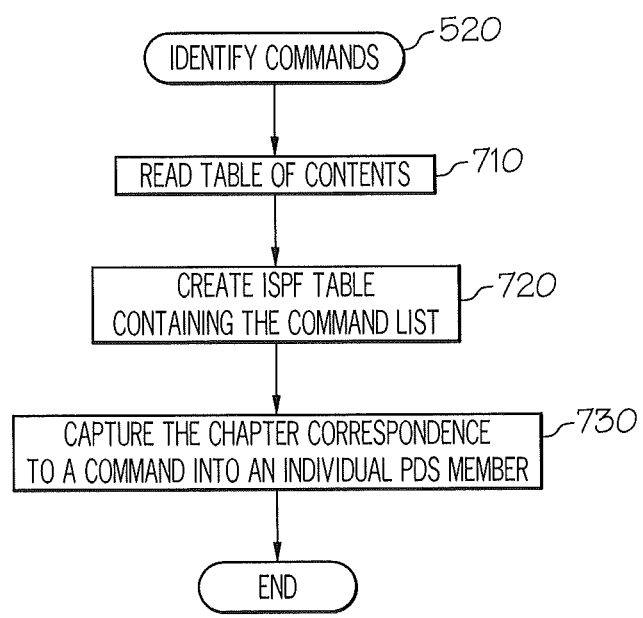

FIG. 7A is a flowchart of operations that may be performed to identify commands, which may correspond to Block 520 of FIG. 5. Referring to FIG. 7A, at Block 710, an edit macro program may be run, which reads the table of contents for the reference guide. At Block 720 an Interactive System Productivity Facility (ISPF) table is created containing the command list. FIG. 11A illustrates an example of a batch job which reads as an input the "Reference Guide" file and perform operations described in Blocks 710, 720 and 730. This operation reads the table of contents (Block 710) and generates as an output the entire product command list. FIG. 11B illustrates the previous operation's output. The next operation uses this output as input to create an ISPF table containing this command list (Block 720). The last operation locates and captures an appropriate command chapter for every command. Referring to Block 730, the chapter corresponding to a command is captured into an individual Partitioned Data Set (PDS) member or other file. For example, FIG. 11C illustrates the PDS member of the AGENTMSG command.

Figure 7B:
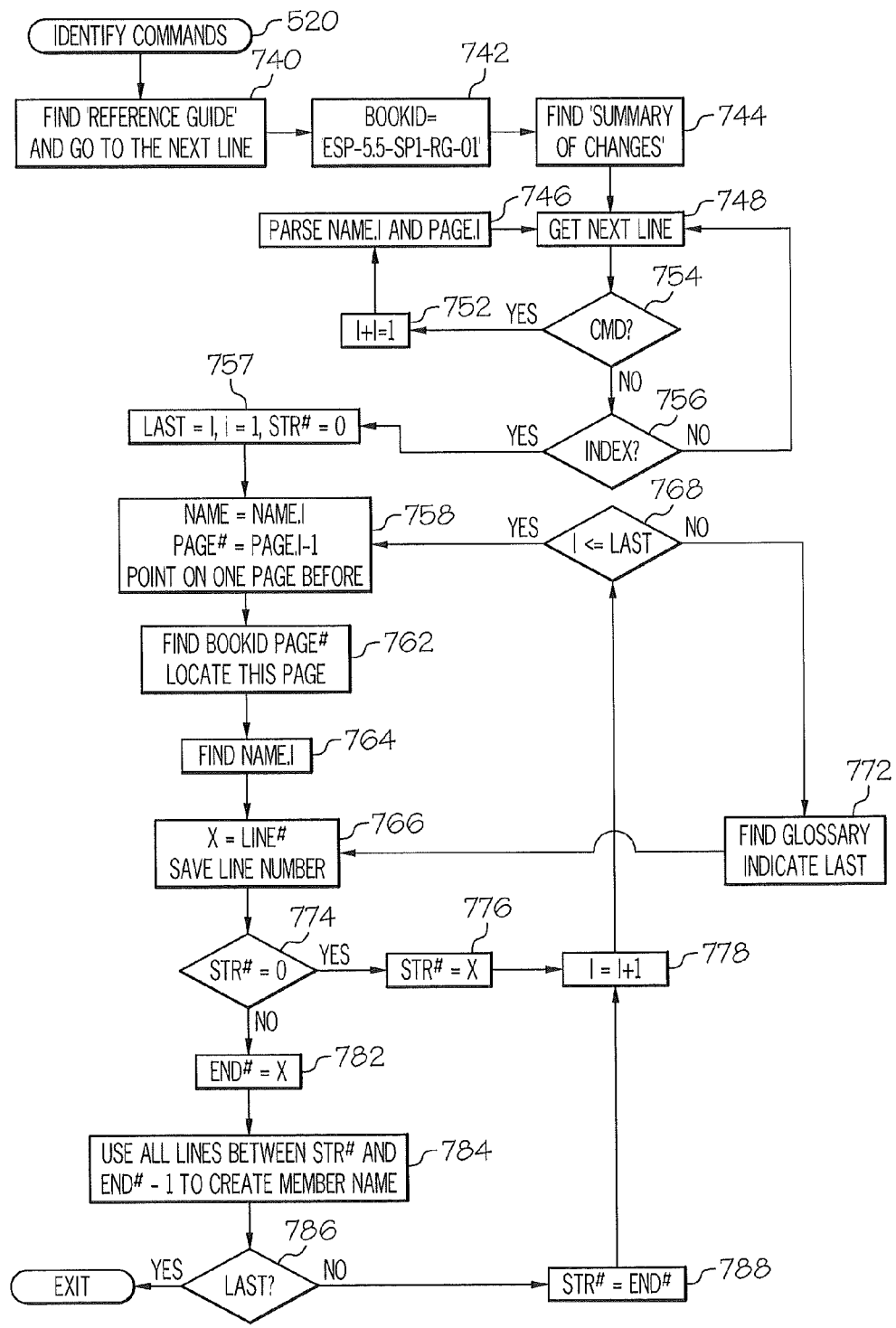

FIG. 7B is a more detailed flowchart of operations that may be performed to identify commands, which may correspond to Block 520 of FIG. 5, according to various other embodiments described herein. Referring to FIG. 7B, at Block 740 the Reference Guide is found and a pointer points to the next line of the reference guide. At Block 742, the internal structure of a PDF or other format is studied to identify page separations in the PDF or other format. Having identified the page separations in the PDF document of the Reference Guide, at Block 744 the "Summary of Changes" section is found so that the "Table of Contents", which generally follows the "Summary of Changes", can be identified. Block 748 gets the next line, which could be the beginning of the Table of Contents. At Block 754 it is determined if a command is present. If so, at Block 752 the index I is incremented and at Block 746 the name and page are parsed so as to capture the command name and the page number where the command starts. Operations of Blocks 748, 754, 752 continue until no further lines of the given command are found. Thus, Blocks 754 and 752 can take into account a single line command or a multi line command (or statement) in the Table of Contents. At Block 756 if the end of the entire Table of Contents is reached, processing continues, whereas if the Table of Contents has not yet been completed, the next line is obtained at Block 748.

Still referring to FIG. 7B, the entire Table of Contents is searched at Block 756. The operations then have knowledge of the command and corresponding page number in the Reference Guide for each command for the computer program product. This knowledge can then be used to create placeholders for the table of dependency lists that will be created later. Accordingly, the operations of Blocks 740-756 can read the Table of Contents, which may correspond to Block 710 of FIG. 7A.

Continuing with the description of FIG. 7B, operations are then performed to identify the lines of the Reference Guide that contain the details of the actual command. Specifically, at Block 757, after the previous loop completion, I is a number of the last command in the list. For example, if there are 700 commands in the table contends, then I will be equal to 700. In Block 757 by setting LAST=I, the last command number is stored in variable LAST. The index i is set to 1 to start a new loop (Block 758) from the first element of array NAME[I], i.e., NAME.1. The STR# variable states for the first line of the current command chapter, and is initialized as zero. At Block 758, counters are set to point to the page before the beginning of the given command. At Block 762, this information is used to locate the page in the PDF or other document. At Block 764, the first line of the current command chapter is found by finding the command name. At Block 766 a line number pointer is set and saved. At Block 774 a start pointer is begun and is set at Block 776. The counter I is then incremented at Block 778 and if the counter is less than the last command number at Block 768, then the processing of Blocks 758, 762, 764, 766 and 774 is again performed. On the other hand, if the start number is not 0 at Block 774 then the end line is set at Block 782. In other words, the first line of the next command chapter is at the same time the current command chapter last line. At Block 784 all of the lines between the start number and end number minus one are captured and inserted into the PDS (library) member, which may correspond to Block 730 of FIG. 7, with a name equal to the current command name (the current command name obtained in Block 758 in variable NAME).

Finally, a test is made at Block 786 to see if this was the last command. If this is not the last command, then at Block 788 the current command chapter last line number is assigned to variable STR#, i.e., for the next iteration it becomes the first line number of the upcoming command chapter, the index is increased at Block 778 and processing loops through Blocks 758-788. On the other hand, when the very last command number is reached at Block 768, then finding the Glossary at Block 772 provides the last command chapter last line number. Accordingly, operations of Blocks 766-786 are performed a last time.

Figure 8:
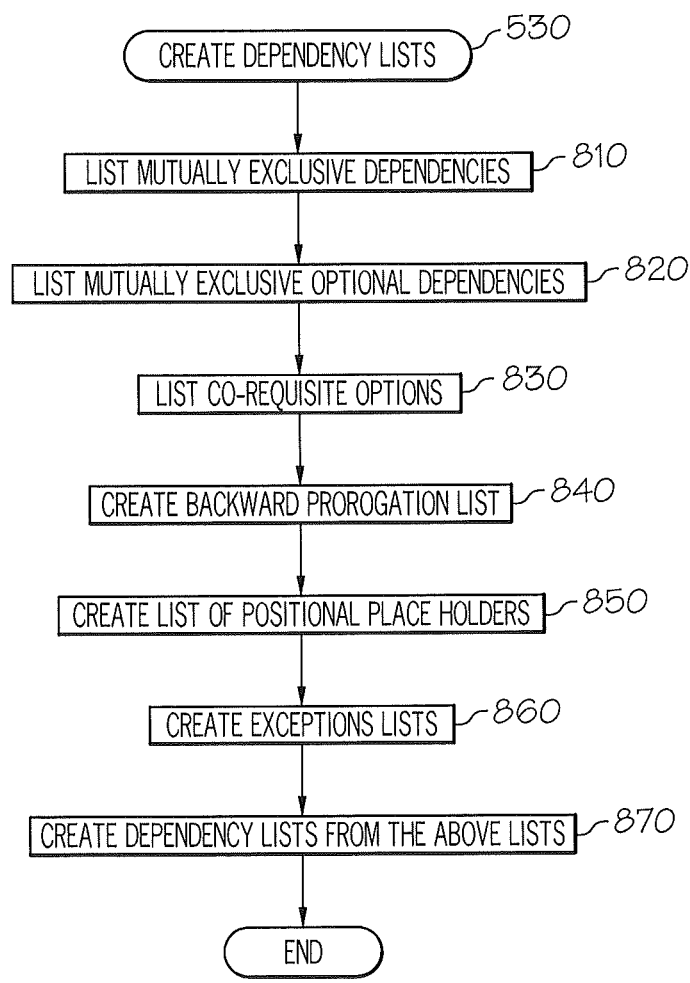

FIG. 8 is a flowchart of operations that may be performed to create dependency lists, which may correspond to Block 530 of FIG. 5. Referring to FIG. 8, five lists of operand dependencies are created from the command syntax diagram of, for example FIG. 11C. At Block 810, a list of mutually exclusive operands, sub-operands and/or parameters is created. At Block 820, a list of mutually exclusive but optional dependencies is created. At Block 830, co-requisite options are identified. At Block 840 a backward propagation list is created, and at Block 850 positional place holders are created to maintain a place holder if an operand is not specified. A syntax analysis tool, for example, as included in the ESP Workload Automation PCMD tool, may be used to implement Blocks 810-850.

Moreover, it has been found that the syntax conversions of Blocks 810-840 may not be sufficient to cover all possible conditional dependencies, because there may be exceptions. To cover the exceptions, an additional operation may be needed to create "exception lists" at Block 860 as follows:
SYNTAX
cmdname A|B|C [Z]
where "cmdname" is the command name, A, B, C are operands or sub-operands and Z is an optional operand or sub-operand. The following syntax may be used for the exceptions in the exceptions list:
IF parm1={SELECTED|NOTSELECTED|value} THEN parm2={REQUIRED|OPTIONAL|value},
where parm1 and parm2 are two different operands or sub-operands.

Finally, referring to Block 870, dependency lists are created from the operations of Blocks 810-860.

Various operations that were described in FIGS. 5-8 will now be described in further detail. These operations will use as an example, the syntax of the AGENTMSG command as shown in the following Table 1:

TABLE 1

AGENTMSG {date|.} {time|.} agentname {from|.} {objectname|.}
CONTROL
{CANCEL|CLRFILES|FLUSH|GETTRACEFILE|

TABLE 1-continued

```
    REFRESH Security|
    SETINITS nnnn|
    SHUTDOWN|
    STATUS|
    MGRADDR PORT(number) ADDRESS(address) [PERSISTENT(TRUE|FALSE)]|
    SETPROPERTY PROPERTY1(log.level={0|1|2|3|4|5})
        [PERSISTENT(TRUE|FALSE)]
    }
RUN.
    {DATA(FILENAME=filename[,LIBRARY=library][,CCEXIT=ccexitname])|
    DATA(CLPNAME=clpname[,LIBRARY=library][,CCEXIT=ccexitname])|
    DATA([LIBRARY=library][,CCEXIT=ccexitname]) COMMAND(command)
    }
    [CURLIB(curlib)]
    [JOBD(jobd)]
    [JOBQ(jobq)]
    [JOBNAME(jobname)]
    [LIBL(listname)]
    [MFUSER(mfuser)]
    [OTHERS(others)]
    [PARAMETERS(parameters)]
    [USER(user)]
TRIGGER
    MONITOR MonitoredNode(node) Nodetype(Manager)
        Nodename(name) Domain(MAIN)
        Applname(applname) Applgen(applgen)
        Jobname(jobname) Jobqual(jobqual)
            State(state) Status(status).
```

During the operations of Blocks 810-860 of FIG. 8, the syntax diagram may be converted character-by-character to create an array of operand vectors Z[J] and an array of operand delimiters D[I,K], where J is an operand sequence number, I is a row number, and K is a column number. The following characters are operand delimiters: ',][{}()(=|'. Quote marks " or ' and comma are attached to the operand name and entered as shown. Ellipsis . . . are attached, but not entered. The set of characters representing operand name, referenced below as 'alphabet', may contain any alphabetical, digit, @, #, $ characters. Moreover, two subsequent keywords, as well as an operand-placeholder pair, are treated as one Z[J] element. When the left operand delimiter is one of these '=', ' ', '(', '{' it indicates the final operand is co-requisite of the previous operand. The character [ starts a set of optional operands. The Z[J] layout is: 'name; position; input field flag; place holder flag; optional flag; co-requisite flag; mandatory flag; or-bar flag; mutually exclusive flag; nesting level'.

Figure 9:
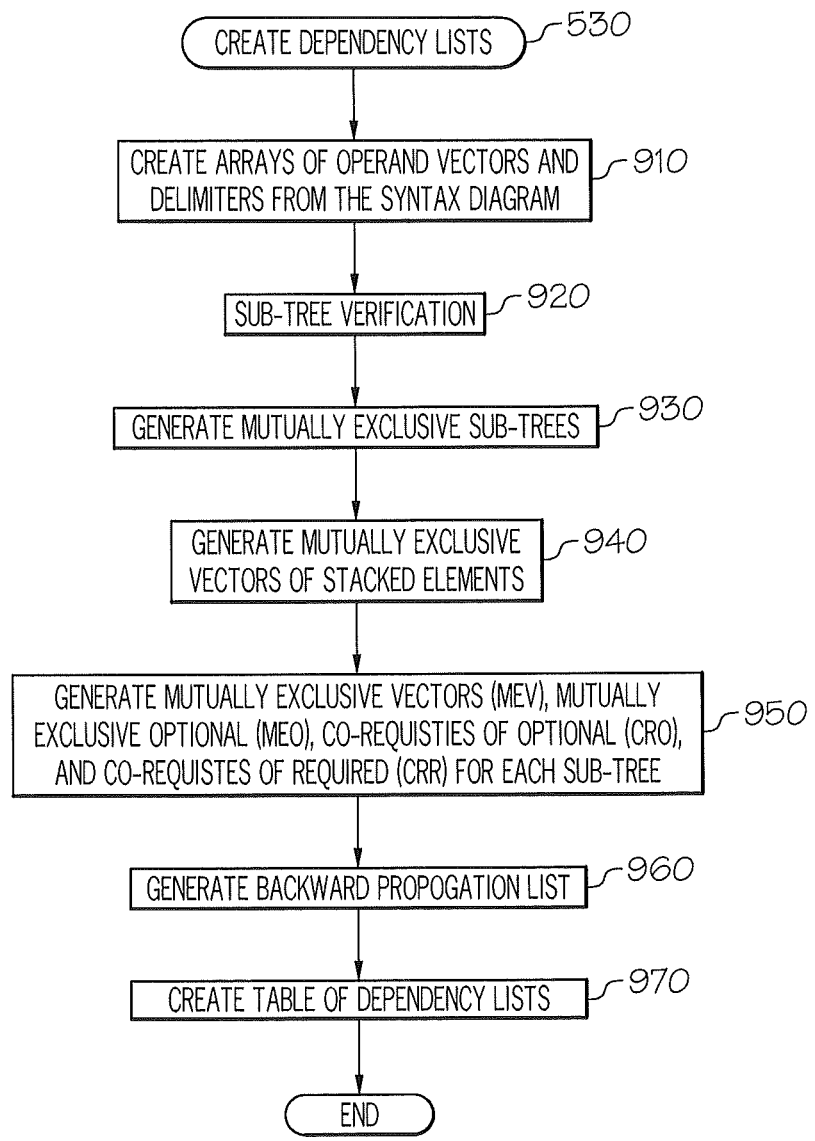

FIG. 9 is a flowchart of operations that may be performed to create dependency lists according to various other embodiments described herein, and may correspond to Block 530 of FIG. 5. Referring to FIG. 9, these operations may include creating arrays of operand vectors and delimiters from the syntax diagram at Block 910. Detailed operations for creating arrays of operand vectors and delimiters will be described in connection with FIG. 12.

Still referring to FIG. 9 at Block 920, sub-tree verification is performed to identify verbs in the command. Detailed operations for sub-tree verification will be described below in connection with FIG. 13.

At Block 930, mutually exclusive sub-trees are generated, as will be described in detail in connection with FIG. 14. Mutually exclusive vectors of stacked elements are generated at Block 940, as will be described in more detail at FIG. 15. At Block 950, Mutually Exclusive Vectors (MEVs), Mutually Exclusive Optional (MEO), Co-Requisites of Optional (CRO) and Co-Requisites of Required (CRR) are then generated for each sub-tree at Block 950, as was described in general at Blocks 810-830 of FIG. 8 and as will be described in more detail in FIG. 16 below. At Block 960 a backward propagation list is then generated, which may correspond generally to Block 840 of FIG. 8 and which will be described in more detail in FIG. 17. Finally, the table of dependency lists is created at Block 970 from the above lists, which may correspond generally to Block 870 of FIG. 8.

Figure 12:
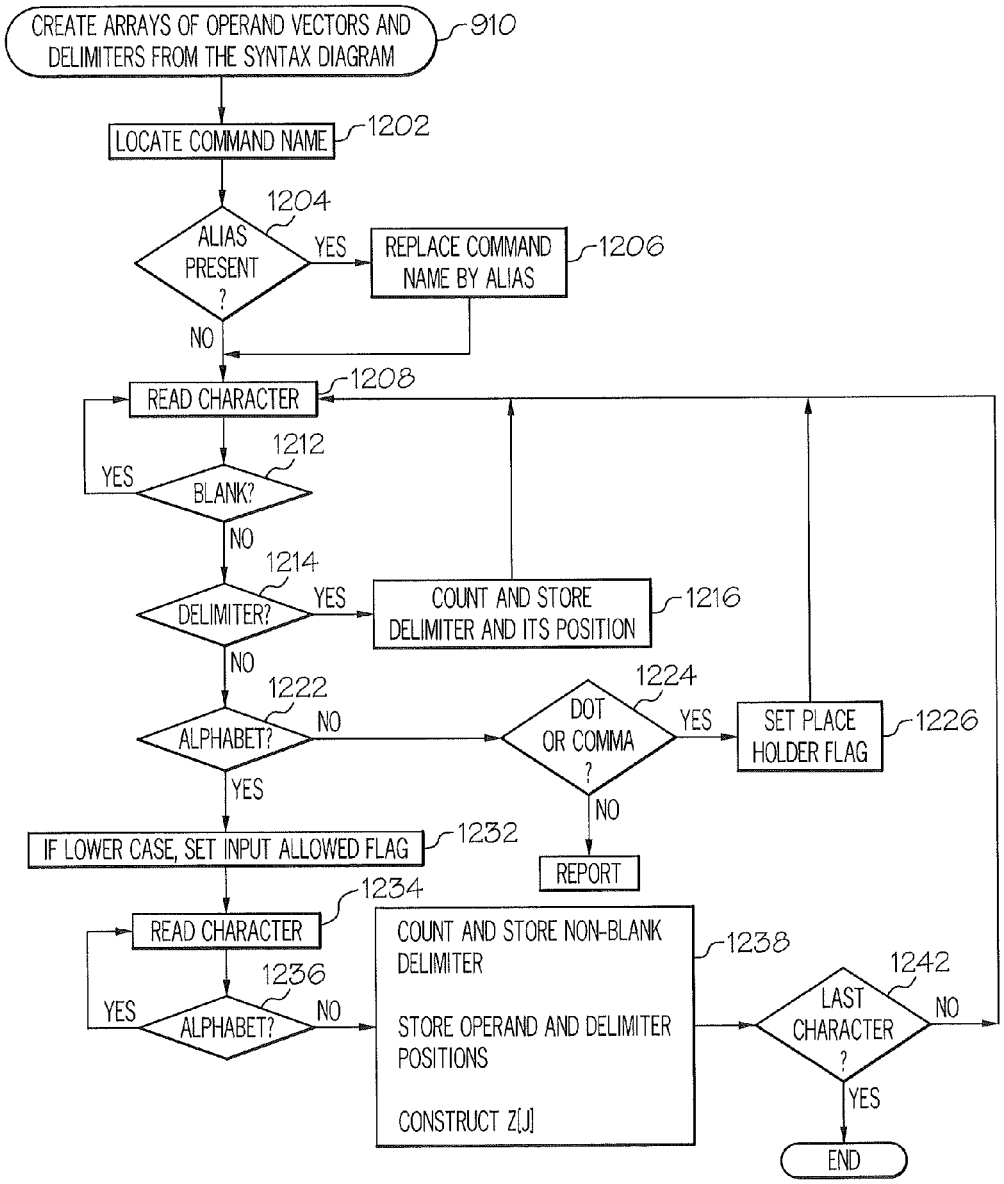
FIGS. 12-17 are flowcharts of other operations that may be performed by command generation systems, methods and computer program products according to various embodiments described herein.

FIG. 12 is a flowchart of operations that may be performed to create arrays of operand vectors and delimiters according to various embodiments described herein. Referring now to FIG. 12, at Block 1202 the command name is located. Moreover, at Block 1204, if an alias is present the command name is replaced by the alias at Block 1206. The character is then read at Block 1208. If a blank is present at Block 1212, then the next character is read. If a blank is not present at Block 1212, a test is made at Block 1214 if the character is a delimiter. If yes, then at Block 1216 the delimiter is counted and the delimiter and the delimiter's position are stored as the D[I,K] array element. On the other hand, if the character is not a delimiter at Block 1214, a test is made as to whether the character is an alphabetical character at Block 1222. If yes, at Block 1232 if the alphabetical character is lower case, an "input allowed" flag is set. The character is then read at Block 1234. At Block 1236, if it is not an alphabetical character, then at Block 1238 a non-blank delimiter is counted and stored, and the operand and the delimiter positions are stored. The delimiter's data is in D[I,K] and operand's data is in Z[J] array, respectively.

Returning back to Block 1222, if the character is not an alphabetical character, then a test is made at Block 1224 as to whether the character is a dot or comma. If so, a placeholder flag is set at Block 1226. If the character is not a dot or comma at Block 1224, then an unrecognizable character is present and is reported. Finally, at Block 1242 if the last character has now been read and processed, the processing ends. If not, the next character is read at Block 1208.

Figure 13:
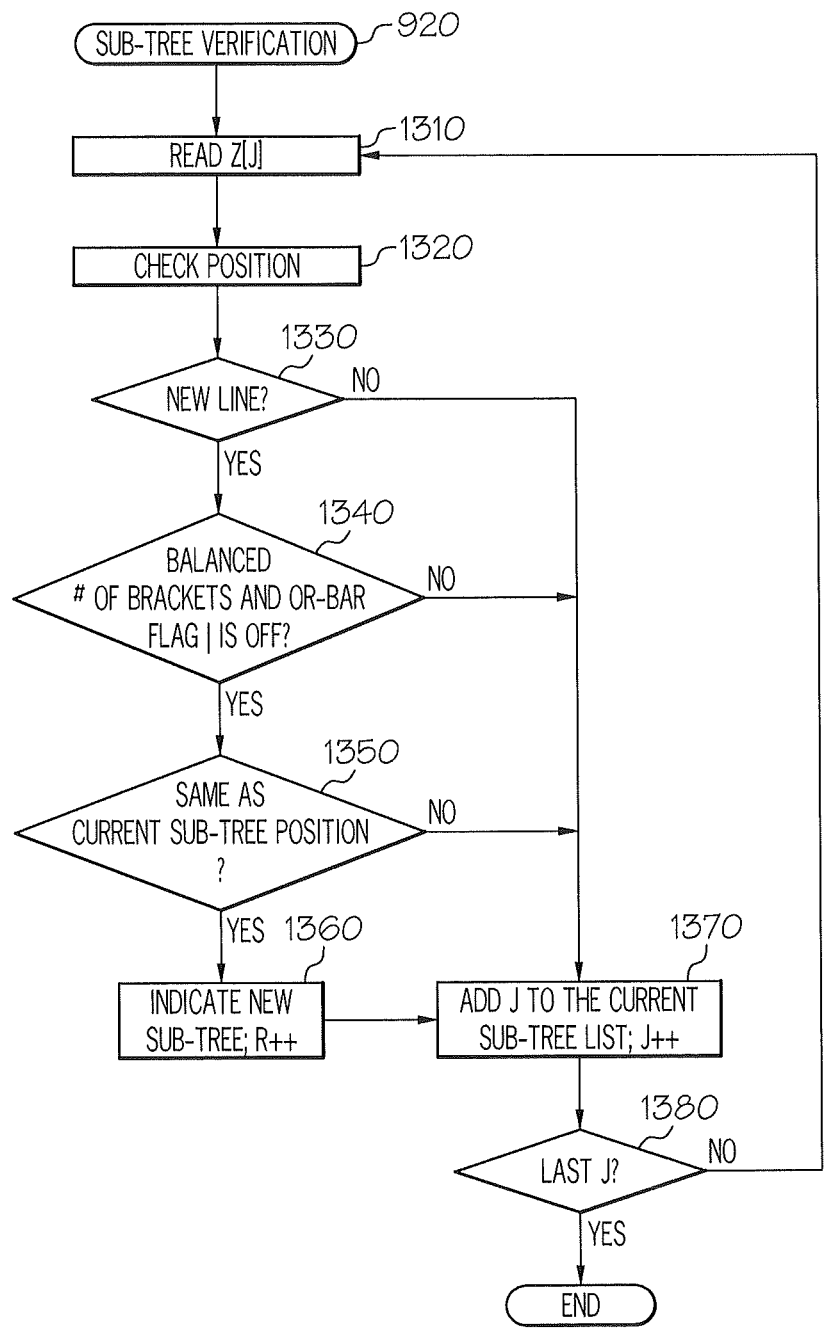

FIG. 13 is flowchart of operations that may be performed to provide sub-tree verification, which may correspond to Block 920 of FIG. 9. As already noted, a sub-tree may correspond to a verb of a command. Operations of FIG. 13 analyze the Z array to recognize if there is more than one sub-tree in the command. The sub-tree can be represented by the list of operand sequence numbers, for example: Sub-tree0: 1, 2, 3, 4, 5, where every number indicates an operand index J value in constructed in the Z[J] array. Sub-tree #0 (R=0) is always present, starting at the first position following the command name operand (if any). The command name position (usually column #1) is a sub-tree0 starting position.

More specifically, referring now to FIG. 13, the array of operand vectors Z[J] is read at Block 1310. At Block 1320, the position is checked and at Block 1330 a determination is made as to whether a new line in the syntax is present. If yes, then at Block 1340 a determination is made as to whether brackets are balanced and the or-bar|flag is off. If so, a determination is made at Block 1350 as to whether this is the same as the current sub-tree position. If yes, a new sub-tree is indicated, the R value is incremented at Block 1360 and at Block 1370 the J value is added to the current sub-tree list and the J value is incremented. On the other hand, if the tests of Blocks 1330, 1340 or 1350 produce a "NO" than a new sub-tree is not present and the operand index value J is incremented at Block 1370. When the last J is reached at Block 1380, operations end. Otherwise the next value in the array is read at Block 1310.

Accordingly, the operations of FIG. 13 may generate the following sub-trees for the AGENTMSG command:
Sub-tree0: 1-5
Sub-tree1: 6-35
Sub-tree2: 36-75
Sub-tree3: 76-94

Sub-tree0 is common for any selection. Thus the sub-tree numbers start with sub-tree1 (R=1), where the numbers following the sub-tree indicate the number of operands in the sub-tree.

Figure 14:
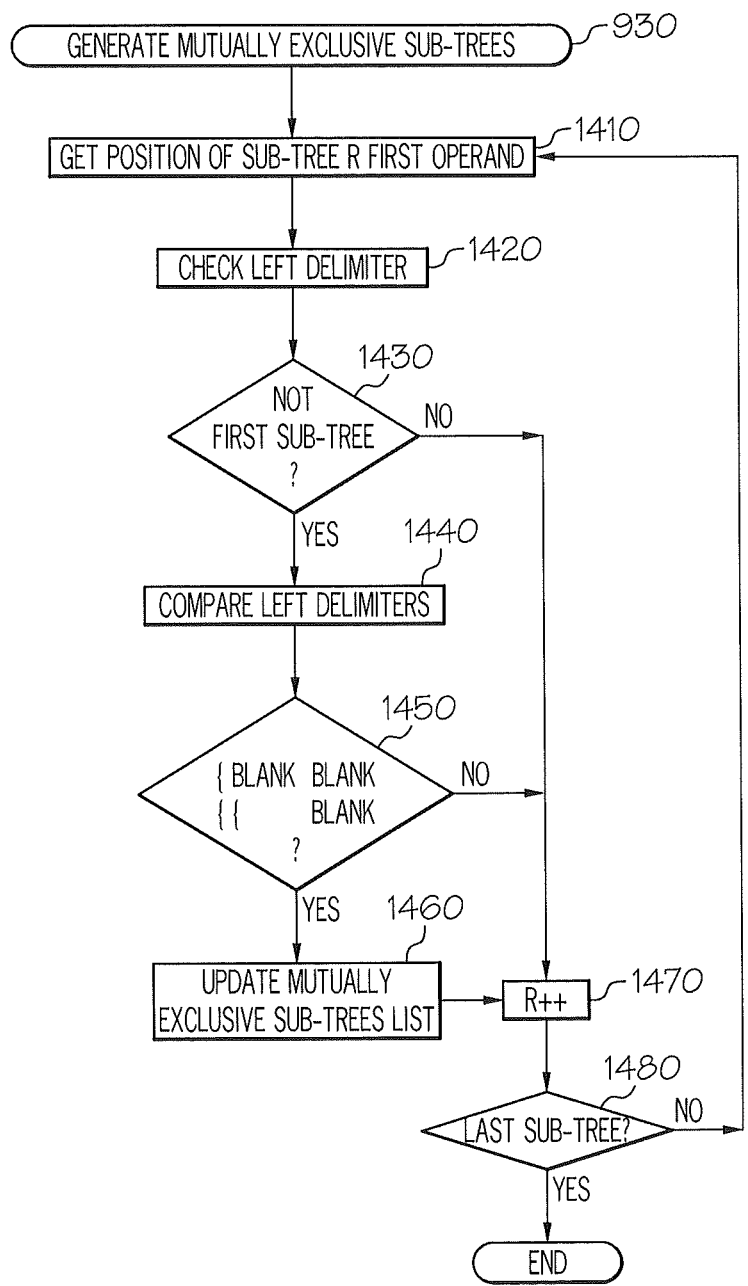

FIG. 14 is a flowchart of operations that may be performed to generate a mutually exclusive sub-trees list, which may correspond to Block 930 of FIG. 9.

Referring to FIG. 14, at Block 1410, the first position of sub-tree R first operand is obtained and at Block 1420 the left delimiter is checked. If not the first sub-tree at Block 1430, then the left delimiters are compared at Block 1440 and if the delimiters have the syntax of Block 1450, then the mutually exclusive sub-trees list is updated at Block 1460 and the R counter is incremented at Block 1470. If this is the last sub-tree at Block 1480 then the operations end. If not, the next sub-tree is examined. Accordingly, for the AGENTMSG command, operations of FIG. 14 may identify sub-trees 1, 2 and 3 as being mutually exclusive: 6-35, 36-75, 76-94.

Figure 15:
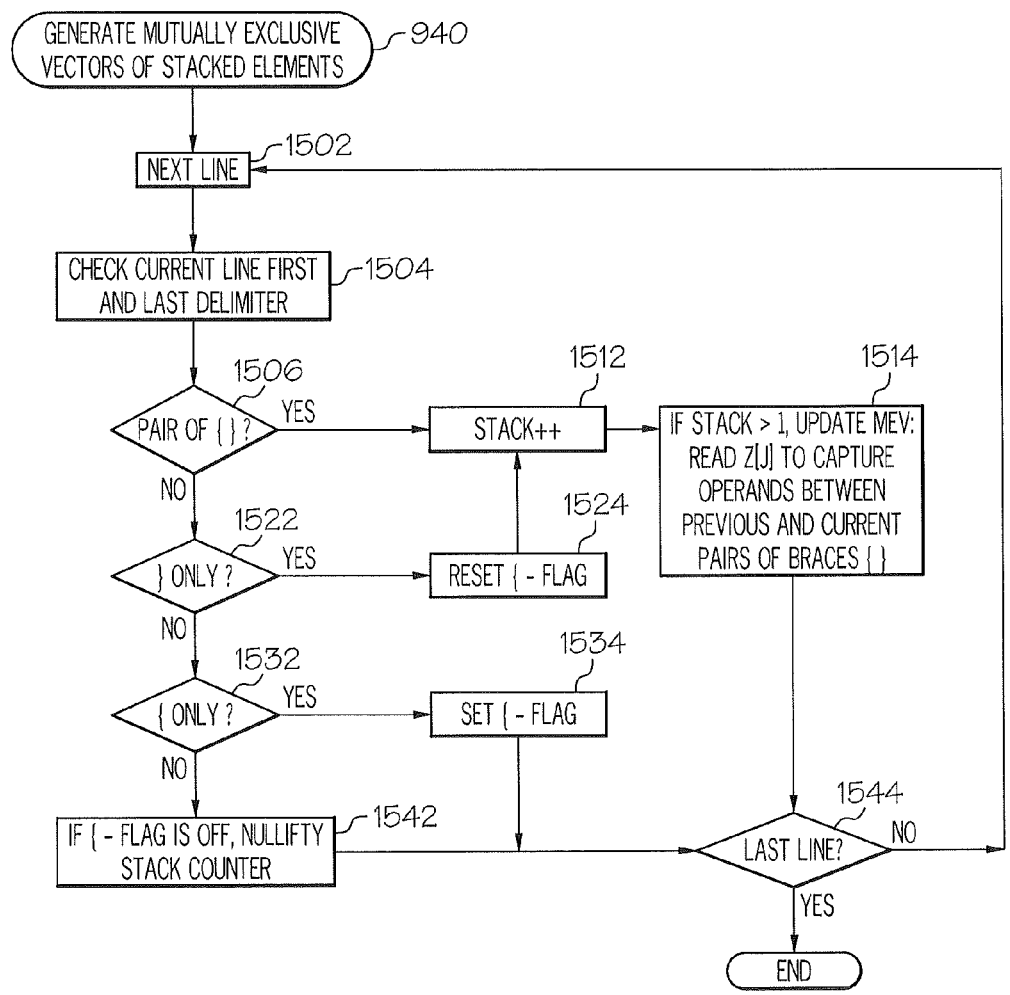

There may be other ways that mutually exclusive sub-trees are indicated in a command syntax. For example, a sub-tree may have stacked operands in braces:
{ }
{ }.
When such construction is present, the operands enclosed in one stack element { } are mutually exclusive with other stack elements. FIG. 15 is a flowchart of operations that may be performed to scan the array of delimiters D[I,K] to generate mutually exclusive vectors of stacked elements in these other constructions, which may correspond to an alternative embodiment of Block 940 of FIG. 9.

Referring to FIG. 15, operations begin at Block 1502 by finding the next line in the array of delimiters. At Block 1504, the current line first and last delimiters are checked. If a pair of { } at Block 1506, then the stack counter is incremented at Block 1512 and if the stack is greater than one at Block 1514, MEV is upgraded as illustrated in Block 1514. On the other hand, if a pair of { } is not found at Block 1506, then at Block 1522, a test is made as to whether only a } is found. If yes, at Block 1524 the { flag is reset and this also indicates a new stack element. This stack element differs from the regular one { } which starts and ends on the same line. This specific stack element represents stack construction which does not end on the same line. For example,

{A

B

C}.

This stack element also should be counted in Block 1512. On the other hand, at Block 1532 if only a { is found then the flag for the { is set at Block 1534. At Block 1542, if the { flag is off, then the stack counter is nullified. Finally at Block 1544, if the last line has been reached, operations end. If not, operations continue with the next line at Block 1502.

Figure 16:
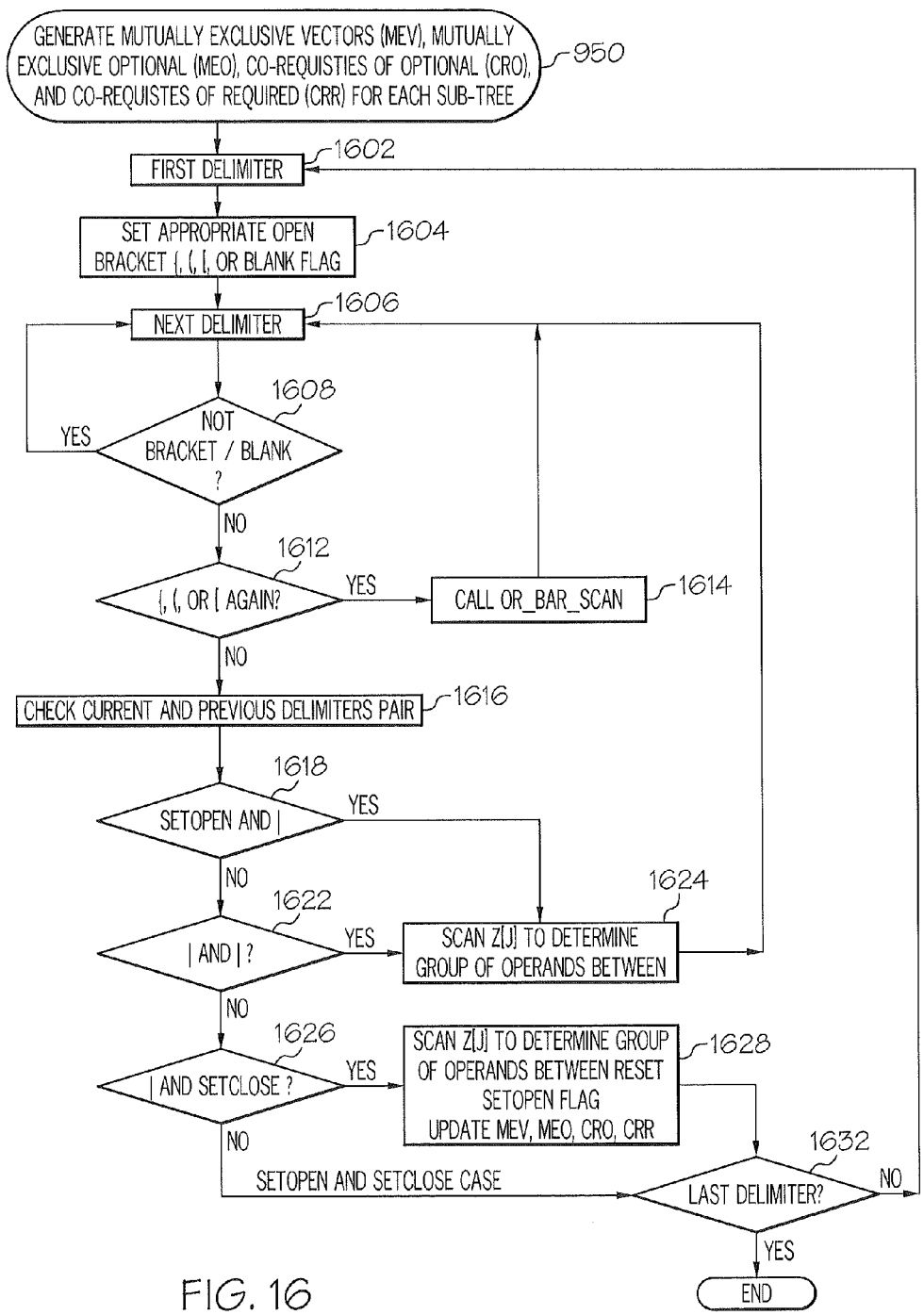

FIG. 16 is a flowchart of operations that may be used to generate MEV, MEO, CRO and CRR values for each sub-tree, which may correspond to Block 950 at FIG. 9. In general, these operations may scan an array of delimiters D [I,K] using the recursive function OR_BAR_SCAN, which determines group of operands separated by |, to generate MEV's (mutually exclusive vectors), MEO's (mutually exclusive optional), CRO's (co-requisites of optional), and CRR's (co-requisites of required) for each sub-tree. For ease of explanation, the following operations will name the first {, (, [, or blank delimiter—setopen, and will name the last }, ), ], or blank—setclose.

Referring to FIG. 16, a first delimiter is obtained at Block 1602 and an appropriate open bracket or blank flag is set at Block 1604. The next delimiter is obtained at Block 1606 and a test is made at Block 1608 as to whether that delimiter is not a bracket or is blank. If no, than a test is made at Block 1612 for the same bracket and if that is the case, the recursive function is called at Block 1614. If this is not the case at Block 1612, then the current and previous delimiter pair is checked at Block 1616 and at Blocks 1618, 1622, and 1626 tests are made as to the location of the corresponding |. At Blocks 1624 and Block 1628, the array is scanned to determine the group of operations between the |s. Finally, if a last delimiter is present at Block 1632, operations end. If not, the next delimiter is scanned. Thus, nested recursive calls are used in FIG. 16 to generate the MEVs, MEOs, CROs and CRRs for each sub-tree.

Figure 17:
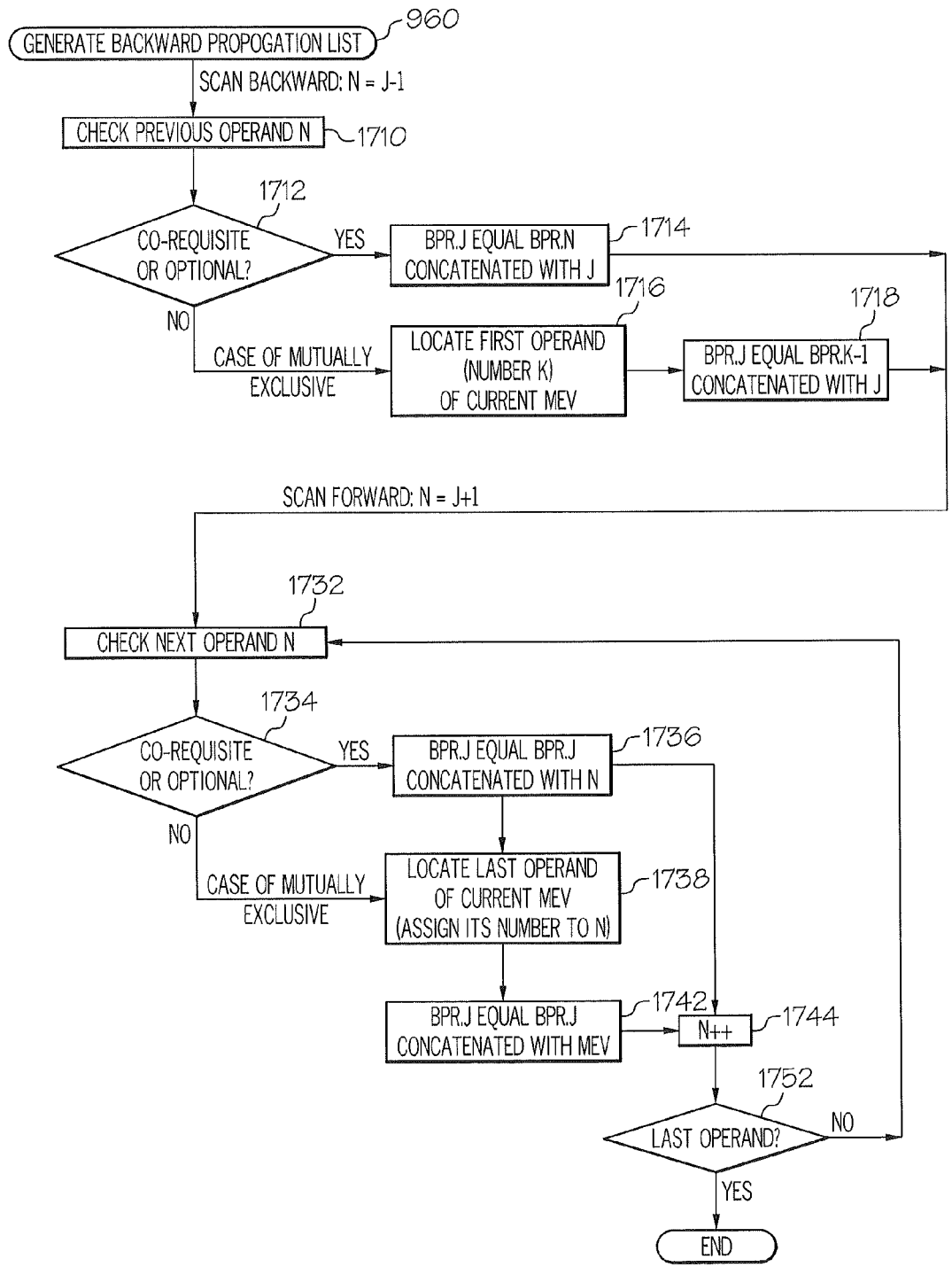

FIG. 17 is a flowchart of operations that may be used to generate a backward propagation list, which may correspond to Block 960 of FIG. 9. More specifically a backward propagation list BPR.J is generated for operand number J within the current sub-tree. A backward scan is performed at Blocks 1710-1718 and a forward scan within the sub-tree is performed at Blocks 1732-1744.

Specifically, at Block 1710 the backward scan begins by checking the previous operand. At Block 1712 a check is made as to whether this operand is co-requisite or optional. If yes, a concatenation is performed at Block 1714. If no, then they are mutually exclusive operands and the first operand is located at Block 1716 and concatenation is performed at Block 1718.

Still referring to FIG. 17, the forward scan takes place by checking the next operand at Block 1732. Again, an identification is made as to whether it is a co-requisite or optional operand at Block 1734. If yes, then a concatenation takes place at Block 1736. If no, the last operand is located at Block 1738 and a concatenation takes place at Block 1742. The end counter is incremented at Block 1744. Finally, if additional operands are present at Block 1752 the next operand is checked again. If not, operations end.

As result of the operations of FIG. 17, for example, BPR.16 for operand MGRADDR will be as follows:

BPR.16='1,2,3,4,5,6,16,17,18,19,20,21-,22-23'

Moreover, BPR.24 for operand SETPROPERTY will be as follows:

BPR.24='1,2,3,4,5,6,24,25,26,27?32,33-,34-35'.

For ease of explanation, the dash sign '-' is used to indicate a single optional operand or a contiguous set of optional operands. The question mark '?' is used to indicate a contiguous set of mutually exclusive operands. Thus, the following sets of vectors are generated:

MEV—mutually exclusive vector
MEO—mutually exclusive optional
CRO—corequisite options
BPR—backward propagation list
PPH—positional place holder The operations of FIGS. 12-17 can create a Table of Dependencies Lists that will have the layout of Table 2:

TABLE 2

```
/* Z0 variable layout: */
/* NumOfParms!NumOfReq!ListOfReq!MEV##!MEV#!MEVlist!MEV#!MEVlist... */
/* where                                                            */
/* ! is delimiter                                                   */
/* NumOfParms - total number of operands, corresponds with variable LASTVAR# */
/* NumOfReq - number of mandatory operands, corresponds with variable BPR.0#  */
*/ ListOfReq - list of mandatory operands separated by comma - BPR.0          */
/* MEV## - number of MEV lists                                     */
/* MEV# - number of operands in MEVlist                            */
/* MEVlist - list of mutually exclusive operands                   */
/* ||, - two vertical bars with comma indicates string concatenation */
In AGENTMSG case:
Z0 = '94!5!1,2,3,4,5!6!3!6-35,36-75,76-94!'||,
'10!7,8,9,10,11,12-13,14,15,16-23,24-35!2!22,23!6!27,28,29,30,31,32!'||,
'2!34,35!3!37-43,44-50,51-57'
/* ZJ variable layout:
/* Operand name!BPR#!BPRlist!MEO#!MEOlist!CRO#!CROlist!inputflag    */
For example,
Z24=' SETPROPERTY!12!1,2,3,4,5,6,24,25,26,27?32,33-,34-35!!!!!'
/* The PPH vector layout:                    */
/* NumOfPlaceHolders!NumOfPos!PlaceHoldChar!NumOfPos!PlaceHoldChar... */
     PPH='5!1!.!2!.!4!.!5!.36!.'
```

This Table 2 (Table of Dependency Lists) is then used by the logical tree presenter 210 as was described above.

As will be appreciated by one of skill in the art, various embodiments described herein may be embodied as a method, data processing system, and/or computer program product. Furthermore, embodiments may take the form of a computer program product on a tangible computer readable storage medium having computer program code embodied in the medium that can be executed by a computer.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Some embodiments are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

In the drawings and specification, there have been disclosed typical embodiments and, although specific terms are employed, they are used in a generic and descriptive sense only and not for purposes of limitation, the scope of the disclosure being set forth in the following claims.

What is claimed is:

1. A command method for a command driven computer system, the command method comprising:
   presenting a list of command driven computer program products in response to activation of the command method;
   presenting a logical tree comprising commands, related operands, sub-operands and related parameters for a command driven computer program product in response to receiving a selection of the command driven computer program product from the list of command driven computer program products;
   identifying, in the commands, related operands, sub-operands and related parameters of the logical tree that is presented, parameters that can be overwritten and parameters that have predefined values; and
   identifying, in the commands, related operands, sub-operands and related parameters of the logical tree that is presented, other operands and sub-operands that are unavailable for selection in response to receiving a selection of an operand or a sub-operand in the logical tree.

2. The method according to claim 1 wherein presenting a logical tree comprising commands, related operands, sub-operands and related parameters for a command driven computer program product in response to receiving a selection of the command driven computer program product from the list of command driven computer program products comprises:
   identifying, in the commands, related operands, sub-operands and related parameters of the logical tree that is presented, operands and sub-operands that are unavailable for selection and operands and sub-operands that are available for selection.

3. The method according to claim 1 wherein identifying, in the commands, related operands, sub-operands and related parameters of the logical tree that is presented, other operands and sub-operands that are unavailable for selection in response to receiving a selection of an operand or sub-operand in the logical tree comprises:
   identifying, in the commands, related operands, sub-operands and related parameters of the logical tree that is presented, other operands and sub-operands that are required in response to the receiving the selection of the operand or sub-operand in the logical tree; and
   identifying, in the commands, related operands, sub-operands and related parameters of the logical tree that is presented, other operands and sub-operands that are mutually exclusive to the operand or sub-operand in response to the receiving the selection of the operand or sub-operand in the logical tree.

4. The method according to claim 1 further comprising:
   building a command in response to receiving a selection of an operand, sub-operand or parameter for the command in the logical tree.

5. The method according to claim 4 further comprising executing the command that was built, in response to receiving an execution command.

6. The method according to claim 1 wherein the logical tree comprising commands, related operands, sub-operands and related parameters is presented in a same format for each of the command driven computer program products in the list of command driven computer program products.

7. The method according to claim 1 wherein the presenting a logical tree comprising commands, related operands, sub-operands and related parameters for a command driven computer program product in response to receiving a selection of the command driven computer program product from the list of command driven computer program products is preceded by:
   generating the logical tree comprising commands, related operands, sub-operands and related parameters for the command driven computer program product.

8. A command method for a command driven computer system, the command method comprising:
   presenting a list of command driven computer program products in response to activation of the command method;
   presenting a logical tree comprising commands, related operands, sub-operands and related parameters for a command driven computer program product in response to receiving a selection of the command driven computer program product from the list of command driven computer program products;

identifying, in the commands, related operands, sub-operands and related parameters of the logical tree that is presented, other operands and sub-operands that are unavailable for selection in response to receiving a selection of an operand or a sub-operand in the logical tree; and identifying, in the commands, related operands, sub-operands and related parameters of the logical tree that is presented, other parameters that are unavailable for selection in response to receiving a selection of a parameter in the logical tree.

9. The method according to claim 8 further comprising:

identifying, in the commands, related operands, sub-operands and related parameters of the logical tree that is presented, parameters that are available for selection in response to receiving a selection of an operand or sub-operand in the logical tree.

10. The method according to claim 8 further comprising:

building a command in response to the receiving a selection of an operand, sub-operand or parameter for the command in the logical tree.

11. A method of generating a logical tree comprising commands and related operands and sub-operands for a command driven computer program product, the method comprising:

first obtaining a text file of a reference guide for the command driven computer program product; then identifying commands for the command driven computer program product from the text file of the reference guide; then creating lists of dependencies of the related operands and sub-operands for the commands for the command driven computer program product, that were identified from the text file of the reference guide; and then generating the logical tree from the list of dependencies and the commands and the related operands and sub-operands that were identified from the text file of the reference guide;

wherein the creating lists of dependencies of the related operands and sub-operands for the commands for the command driven computer program product, that were identified from the text file of the reference guide comprises:

creating lists of mutually exclusive and co-requisite operands and sub-operands for the commands for the command driven computer program product, that were identified from the text file of the reference guide; and creating a list of exceptions that identifies conditional dependencies that are not covered by the lists of mutually exclusive and co-requisite operands and sub-operands for the commands for the command driven computer program product, that were identified from the text file of the reference guide; and wherein the generating comprises generating the commands and related operands and sub-operands of the logical tree from the lists of mutually exclusive and co-requisite operands and sub-operands, the commands and related operands and sub-operands of the logical tree that is generated identifying the mutually exclusive and co-requisite operands and sub-operands.

12. The method according to claim 11:

wherein the generating further comprises generating the logical tree from the list of exceptions that identifies conditional dependencies, the commands and related operands and sub-operands of the logical tree that is generated identifying the exceptions that identify the conditional dependencies.

13. The method according to claim 12 wherein an exception in the list of exceptions comprises the following syntax:

IF parm1={SELECTED|NOTSELECTED|value} THEN parm2={REQUIRED|OPTIONAL|value}, where parm1 and parm2 are two different operands or sub-operands.

14. A command driven computer system comprising:

a processor; and a memory coupled to the processor and comprising computer readable program code that when executed by the processor causes the processor to perform operations comprising:

presenting a list of command driven computer program products in response to activation of the command method;

presenting a logical tree comprising commands, related operands, sub-operands and related parameters for a command driven computer program product in response to receiving a selection of the command driven computer program product from the list of command driven computer program products;

identifying, in the commands, related operands, sub-operands and related parameters of the logical tree that is presented, parameters that can be overwritten and parameters that have predefined values; and identifying, in the commands, related operands, sub-operands and related parameters of the logical tree that is presented, other operands and sub-operands that are unavailable for selection in response to receiving a selection of an operand or a sub-operand in the logical tree.

15. The computer system according to claim 14 wherein identifying, in the commands, related operands, sub-operands and related parameters of the logical tree that is presented, other operands and sub-operands that are unavailable for selection in response to receiving a selection of an operand or sub-operand in the logical tree comprises:

identifying, in the commands, related operands, sub-operands and related parameters of the logical tree that is presented, other operands and sub-operands that are required in response to the receiving the selection of the operand or sub-operand in the logical tree; and identifying, in the commands, related operands, sub-operands and related parameters of the logical tree that is presented, other operands and sub-operands that are mutually exclusive to the operand or sub-operand in response to the receiving the selection of the operand or sub-operand in the logical tree.

16. The computer system according to claim 15 wherein the operations further comprise:

first obtaining a text file of a reference guide for the command driven computer program product; then identifying commands for the command driven computer program product from the text file of the reference guide; then creating lists of dependencies of the related operands, sub-operands and the related parameters for the commands for the command driven computer program product, that were identified from the text file of the reference guide; and then generating the logical tree from the list of dependencies, and the commands, the related operands and sub-operands and the related parameters that were identified from the text file of the reference guide.

17. The computer system according to claim 16 wherein the creating lists of dependencies of the related operands, sub-operands and the related parameters for the commands for the command driven computer program product, that were identified from the text file of the reference guide comprises:

creating lists of mutually exclusive and co-requisite operands and sub-operands for the commands for the command driven computer program product, that were identified from the text file of the reference guide; and wherein the generating comprises generating the commands, the related operands, sub-operands and the related parameters of the logical tree from the lists of mutually exclusive and co-requisite operands and sub-operands, the commands and related operands and sub-operands of the logical tree that were identified from the text file of the reference guide.

18. A command driven computer system comprising:

a processor; and a memory coupled to the processor and comprising computer readable program code that when executed by the processor causes the processor to perform operations comprising:

presenting a list of command driven computer program products in response to activation of the command method;

presenting a logical tree comprising commands, related operands, sub-operands and related parameters for a command driven computer program product in response to receiving a selection of the command driven computer program product from the list of command driven computer program products;

identifying, in the commands, related operands, sub-operands and related parameters of the logical tree that is presented, other operands and sub-operands that are unavailable for selection in response to receiving a selection of an operand or a sub-operand in the logical tree; and identifying, in the commands, related operands, sub-operands and related parameters of the logical tree that is presented, other parameters that are unavailable for selection in response to receiving a selection of a parameter in the logical tree.

* * * * *